(12) United States Patent
Sofronov et al.

(10) Patent No.: US 12,389,089 B2
(45) Date of Patent: Aug. 12, 2025

(54) THERMAL SENSOR, THERMAL SENSOR ARRAY, ELECTRONIC APPARATUS INCLUDING THE THERMAL SENSOR, AND OPERATING METHOD OF THE THERMAL SENSOR

(71) Applicant: SAMSUNG ELECTRONICS CO., LTD., Suwon-si (KR)

(72) Inventors: Anton Nikolaevich Sofronov, St. Petersburg (RU); Sergey Nikolaevich Koptyaev, Nizhniy Tagil (RU); Maxim Vladimirovich Ryabko, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 206 days.

(21) Appl. No.: 18/367,287

(22) Filed: Sep. 12, 2023

(65) Prior Publication Data
US 2024/0089568 A1 Mar. 14, 2024

(30) Foreign Application Priority Data

Sep. 12, 2022 (RU) .............................. 2022124059
Jul. 17, 2023 (KR) ...................... 10-2023-0092468

(51) Int. Cl.
*H04N 23/11* (2023.01)
*G01J 5/0818* (2022.01)
(Continued)

(52) U.S. Cl.
CPC ............ *H04N 23/11* (2023.01); *G01J 5/0818* (2013.01); *G01J 5/24* (2013.01); *G01J 2005/0077* (2013.01); *G01J 2005/204* (2013.01)

(58) Field of Classification Search
CPC ........ H04N 23/11; H04N 23/13; H04N 23/56; G01J 5/0818; G01J 5/24; G01J 2005/0077; G01J 2005/204; G01J 5/0821; G01J 5/44
(Continued)

(56) References Cited

U.S. PATENT DOCUMENTS 5,249,866 A 10/1993 Dube et al.
6,040,577 A 3/2000 Mauduit
(Continued)

FOREIGN PATENT DOCUMENTS

CN 110062727 A 7/2019
EP 1 002 425 B1 12/2004
(Continued)

OTHER PUBLICATIONS

Boyd, "Nonlinear Optics," Fourth Edition, Academic Press, 2020, total 622 pages.
(Continued)

*Primary Examiner* — Jamie J Atala
*Assistant Examiner* — Mahmoud Kamal Abouzahra
(74) *Attorney, Agent, or Firm* — Sughrue Mion, PLLC

(57) ABSTRACT

A thermal sensor, a thermal sensor array, an electronic apparatus including the thermal sensor, and an operating method of the thermal sensor are provided. The thermal sensor includes a first region onto which first infrared light is incident, a visible light radiation region configured to radiate visible light generated by incidence of the first infrared light on the first region, a second region onto which second infrared light is incident, and an image sensor configured to receive the visible light radiated from the visible light radiation region. The first region, the second region, and the visible light radiation region each include a nonlinear optical material.

20 Claims, 19 Drawing Sheets

(51) Int. Cl.
*G01J 5/24* (2006.01)
*G01J 5/00* (2022.01)
*G01J 5/20* (2006.01)

(58) Field of Classification Search
USPC .......................................................... 348/164
See application file for complete search history.

(56) References Cited

U.S. PATENT DOCUMENTS

| | | | |
|---|---|---|---|
| 7,551,059 B2 | 6/2009 | Farrier | |
| 7,667,200 B1 * | 2/2010 | Watts | G01J 5/44 250/338.1 |
| 8,610,070 B2 | 12/2013 | Schimert et al. | |
| 9,267,853 B2 | 2/2016 | Fernandes et al. | |
| 10,247,676 B1 * | 4/2019 | Shaw | G02B 6/02052 |
| 10,819,927 B1 | 10/2020 | Mikes | |
| 11,021,177 B2 | 6/2021 | Hania et al. | |
| 2011/0062334 A1 | 3/2011 | Ben-Bassat | |
| 2016/0327743 A1 | 11/2016 | Kippenberg et al. | |
| 2017/0088944 A1 | 3/2017 | Sultana et al. | |
| 2020/0307661 A1 | 10/2020 | Hania et al. | |
| 2021/0209376 A1 | 7/2021 | Baetens et al. | |
| 2021/0349354 A1 | 11/2021 | Abdulhalim et al. | |
| 2021/0372856 A1 | 12/2021 | Kim et al. | |
| 2023/0311960 A1 | 10/2023 | Hania et al. | |

FOREIGN PATENT DOCUMENTS

| | | |
|---|---|---|
| WO | 2018/073778 A1 | 4/2018 |
| WO | 2018/073778 A9 | 4/2018 |
| WO | 2019/229261 A1 | 12/2019 |

OTHER PUBLICATIONS

Levy et al., "Harmonic generation in silicon nitride ring resonators," Optics Express, vol. 19, No. 12, pp. 11415-11421, Jun. 2011.

Nitiss et al., "Optically reconfigurable quasi-phase-matching in silicon nitride microresonators," Nature Photonics, vol. 16, pp. 134-141, Feb. 2022, total 10 pages.

Anonymous, "Taylor series," Wikipedia, Last updated Jul. 23, 2024, total 8 pages, Retrieved from https://ru.wikipedia.org/wiki/%D0%A0%D1%8F%D0%B4_%D0%A2%D0%B5%D0%B9%D0%BB%D0%B E%D1%80%D0%BO.

Yan et al., "Cognitive Fusion of Thermal and Visible Imagery for Effective Detection and Tracking of Pedestrians in Videos," Cognitive Computation, vol. 10, pp. 94-104, 2018.

Shopovska et al., "Deep Visible and Thermal Image Fusion for Enhanced Pedestrian Visibility," Sensors 2019, vol. 19, No. 3727, 2019, total 21 pages.

Pfeiffer et al., "Photonic Damascene process for integrated high-Q microresonator based nonlinear photonics," Optica, vol. 3, No. 1, pp. 20-25, Jan. 2016.

"3. Optical Microresonator Theory," In: Optical Microresonators. Optical Sciences, vol. 138, 2008, total 33 pages, Retrieved from https://doi.org/10.1007/978-0-387-73068-4_3.

* cited by examiner

THERMAL SENSOR, THERMAL SENSOR ARRAY, ELECTRONIC APPARATUS INCLUDING THE THERMAL SENSOR, AND OPERATING METHOD OF THE THERMAL SENSOR

CROSS-REFERENCE TO RELATED APPLICATIONS

This application claims the benefit of Russian Patent Application No. 2022124059, filed on Sep. 12, 2022, in the Russian Patent Office and Korean Patent Application No. 10-2023-0092468, filed on Jul. 17, 2023, in the Korean Intellectual Property Office, the disclosures of which are incorporated herein by reference in their entireties.

BACKGROUND

1. Field

The disclosure relates to an infrared sensor, and more particularly, to a thermal sensor, a thermal sensor array, an electronic apparatus including the thermal sensor, and an operating method of the thermal sensor.

2. Description of the Related Art

Infrared (IR) image sensors (e.g., thermal sensors) use electronic signal readout for sensing. That is, data is obtained by measuring a current or a voltage.

These IR image sensors may require high sensitivity, small size, and compatibility with complementary metal-oxide-semiconductor (CMOS) technology.

IR image sensors may be classified into sensors compatible with the CMOS technology and sensors incompatible with the CMOS technology. The IR image sensors compatible with the CMOS technology and the IR image sensors incompatible with the CMOS technology may be different from each other in terms of sensitivity and design.

SUMMARY

One or more example embodiments provide a low-cost thermal sensor, a method of operating the thermal sensor, and an electronic apparatus including the thermal sensor.

Further, one or more example embodiments provide a thermal sensor compatible with a CMOS image sensor (compatible with CMOS technology).

Still further, one or more example embodiments provide a compact thermal sensor with increased degree of integration.

Still further, one or more example embodiments provide a thermal sensor array including the thermal sensor, and an electronic apparatus including the thermal sensor array.

Additional aspects will be set forth in part in the description which follows and, in part, will be apparent from the description, or may be learned by practice of the presented embodiments.

According to an aspect of the disclosure, a thermal sensor may include a first region onto which first infrared light is incident; a visible light radiation region configured to emit visible light that is generated in response to the first infrared light being incident on the first region; a second region onto which second infrared light is incident; and an image sensor configured to receive the visible light emitted from the visible light radiation region, wherein each of the first region, the second region, and the visible light radiation region may include a nonlinear optical material.

In an example, the first region, the second region, and the visible light radiation region may be connected to one another. The visible light radiation region may be in the second region. In an example, the visible light radiation region may be located between an edge of the second region and a center of the second region, and surround the center.

In an example, the visible light radiation region may be in an outer boundary of the second region.

The visible light may include harmonics generated by incidence of the first infrared light on the first region.

In an example, the visible light radiation region may include a decoupler arranged at a harmonic resonance distance where the harmonics are reached. The decoupler may include a diffraction grating.

In an example, the thermal sensor may include a resonator optically coupled to the image sensor, a waveguide configured to form optical coupling between a part of the waveguide and the resonator; a light source provided to emit the first infrared light into the waveguide; and a controller configured to change a wavelength of light emitted from the light source to correspond to a change of a resonant wavelength of the resonator, wherein the resonator may include a top surface and a side surface, and a region of the side surface of the resonator, which forms the optical coupling with the waveguide, may correspond to the first region, the top surface of the resonator corresponds to the second region, and the visible light radiation region may be a partial region of the top surface.

In an example, a portion of the waveguide, optically coupled to the resonator, may be linear or curved. The waveguide may include a non-linear optical material.

In an example, the thermal sensor may further include a transparent substrate including a through-hole and a thermally insulating bridge provided to connect the transparent substrate to the resonator and support the resonator, in which the resonator is located inside the through-hole and does not directly contact the substrate, and a part of the through-hole except for the resonator and the thermally insulating bridge is filled with a thermally insulating layer.

In an example, the image sensor may include a complementary metal oxide semiconductor (CMOS) image sensor.

In an example, the nonlinear optical material may include a silicon nitride.

In an example, a plurality of through-holes may be provided to be separated from each other in the transparent substrate, the resonator, the thermally insulating bridge, and the thermally insulating layer may be provided in each of the plurality of through-holes, and the waveguide may be shared by the resonators provided in the plurality of through-holes.

In an example, the plurality of through-holes may be arranged to form a matrix, an optical splitter may be further provided between the light source and the plurality of through-holes, the waveguide may include a plurality of waveguides, and one of the plurality of waveguides may be provided between the light source and the optical splitter, and the others of the plurality of waveguides may be arranged in a one-to-one correspondence with rows or columns of the plurality of through-holes.

According to another aspect of the disclosure, a first electronic apparatus (thermal imaging camera) includes an infrared optical system configured to form a thermal image of an object and a thermal sensor arranged at a focal distance of the infrared optical system on which the thermal image is imaged. The thermal sensor may include a first region onto which first infrared light is incident, a visible light radiation region configured to radiate visible light generated by incidence of the first infrared light on the first region, a second region onto which the thermal image is incident, and an image sensor provided at a position to receive the visible light radiated from the visible light radiation region, and the first region, the second region, and the visible light radiation region each may include a nonlinear optical material.

In an example, the first electronic apparatus may further include a resonator optically coupled to the image sensor and including the nonlinear optical material, a waveguide close to the resonator to form optical coupling between a part thereof and the resonator, a light source provided to irradiate the first infrared light into the waveguide, and a controller provided to change a wavelength of light radiated from the light source to correspond to a change of a resonant wavelength of the resonator and connected to the image sensor. The resonator may include a top surface and a side surface, and a region of the side surface of the resonator, which forms optical coupling with the waveguide, may correspond to the first region, the top surface of the resonator may correspond to the second region, and the visible light radiation region may be a partial region of the top surface.

According to another aspect of the disclosure, a second electronic apparatus may include the thermal sensor or the first electronic apparatus according to an embodiment described above.

According to another aspect of the disclosure, an operating method of a thermal sensor includes receiving visible light radiated from a resonator of the thermal sensor before shifting of a resonant wavelength of the resonator to obtain first data about a first visible image of the resonator, receiving visible light radiated from the resonator after shifting of the resonant wavelength of the resonator due to incidence of external infrared light onto the resonator to obtain second data about a second visible image of the resonator, obtaining, based on the first data and the second data, third data about shifting of the resonant wavelength of the resonator due to the incidence of the external infrared light, and calculating, based on the third data, a temperature of the resonator and an intensity of the external infrared light on the resonator due to the incidence of the external infrared light.

In an example, the visible light may be generated from infrared light introduced into the resonator from inside of the thermal sensor to correspond to the resonant wavelength of the resonator, and the resonator may include a decoupler configured to radiate the visible light.

In an example, the third data may be transmitted to a display device.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
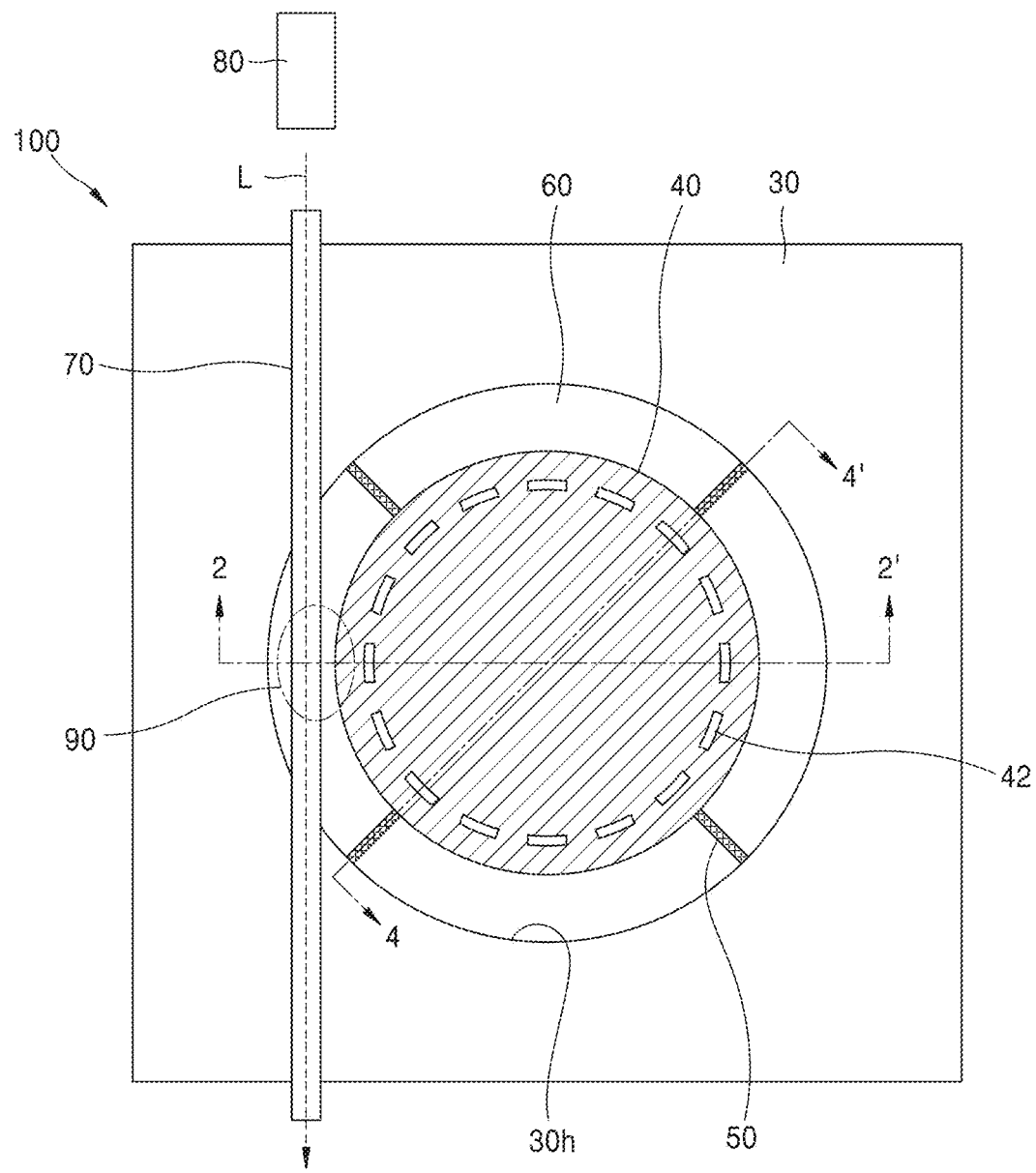
FIG. 1 is a plane view of a first thermal sensor according to an embodiment.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of components, modify the entire list of components and do not modify the individual components of the list. Expressions such as "at least one of," when preceding a list of components, modify the entire list of components and do not modify the individual components of the list.

Hereinbelow, a thermal sensor, a thermal sensor array, an electronic apparatus including the thermal sensor, and an operating method of the thermal sensor according to an embodiment will be described in detail with reference to the accompanying drawings. In this process, a thickness of a layer or region shown in the drawings may be shown as being slightly exaggerated for clarity of a specification.

Embodiments to be described are merely examples, and various modifications may be made from such embodiments. In a layer structure described below, an expression "above" or "on" may include not only an expression "directly on in contact" but also an expression "on contactlessly". In the following description, the same reference numeral in each drawing may refer to the same member.

Singular forms include plural forms unless apparently indicated otherwise contextually. When a portion is referred to as "comprises" a component, the portion may not exclude another component but may further include another component unless stated otherwise.

The use of the terms of "the above-described" and similar indicative terms may correspond to both the singular forms and the plural forms. When there is no apparent description of the order of operations constituting a method or a contrary description thereof, the operations may be performed in an appropriate order. The disclosure is not necessarily limited according to the describing order of the operations.

The term used herein such as "unit" or "module" indicates a unit for processing at least one function or operation, and may be implemented in hardware, software, or in a combination of hardware and software.

Connections of lines or connection members between components shown in the drawings are illustrative of functional connections and/or physical or circuit connections, and in practice, may be represented as alternative or additional various functional connections, physical connections, or circuit connections.

The use of all examples or exemplary terms is only to describe technical spirit in detail, and the scope is not limited by these examples or terms unless limited by the claims.

FIG. 1 shows a first thermal sensor 100 according to an embodiment.

Referring to FIG. 1, the first thermal sensor 100 may include a substrate 30, a microresonator 40, a waveguide 70 positioned in proximity to the microresonator 40, and a light source 80 configured to inject light into the waveguide 70. In an example, the substrate 30 may have transparency to incident light, including visible light. In an example, the substrate 30 may be thermally stabilized not to affect an operation of the resonator 40, and a temperature throughout the substrate 30 may be constant or substantially constant. In an example, the substrate 30 may include a silicon oxide substrate or a silicon oxide. A through-hole 30$h$ may be formed in the substrate 30. The through-hole 30$h$ may have a circular planar shape, but may also have a non-circular shape (e.g., a square shape). In an example, the through-hole 30$h$ may be provided in a ring shape. The resonator 40 may be provided in the through-hole 30$h$. The planar shape of the resonator 40 may be or may not be the same as the planar shape of the through hole 30$h$. In an example, the planar shape of the through-hole 30$h$ may be rectangular, and the planar shape of the resonator 40 may be circular. An edge of the resonator 40 may be separated from a boundary of the through-hole 30$h$. A distance between the resonator 40 and the boundary of the through-hole 30$h$ may be constant or substantially constant from a circumference of the resonator 40, without being limited thereto. A material layer substantially thermally insulated, i.e., a thermally insulating layer 60 may be positioned between the resonator 40 and the substrate 30. The thermally insulating layer 60 may be a gas layer (e.g., an air layer) or a material layer (e.g., a solid layer) that is not gaseous. In an example, the thermally insulating layer 60 may be a gas layer at a substantially lower pressure compared to atmospheric pressure, and that is, the thermally insulating layer 60 may be substantially vacuum (layer).

Light may be incident onto the resonator 40 from outside of the thermal sensor 100. The resonator 40 may include a nonlinear optical material (substance) that absorbs the light (hereinafter, "outside light") incident from outside of the thermal sensor 100 or may be formed of the substance. In an example, the outside light may be or include light of an infrared region. In an example, the outside light may include at least one of short wavelength infrared (SWIR), middle wavelength infrared (MWIR) light, or long wavelength infrared (LWIR). The resonator 40 may completely or partially absorb the outside light. In an example, the resonator 40 may include or be formed of a first material that is a nonlinear optical material capable of absorbing 40% or more, 50% or more, 60% or more, 70% or more, 80% or more, 90% or more, or 95% or more of the outside light incident through a region to which the outside light is incident. In an example, the first material may include, but is not limited to, a silicon nitride. When the resonator 40 absorbs the outside light, the resonator 40 may be heated as a result of absorbing the outside light, and a temperature of the resonator 40 may be greater than before the outside light is absorbed. A temperature change of the resonator 40 due to a thermo-optic effect may cause a refractive index change of the resonator 40, such that a resonance wavelength (or resonant wavelength) of the resonator 40 before absorption of the outside light may change after absorption of the outside light. A degree of change of the resonant wavelength, i.e., a shift of the resonant wavelength, of the resonator 40 may be proportional to an intensity of the outside light.

The resonator 40 may include a first decoupler 42 in a region to which the outside light is incident. As the first decoupler 42 is included, visible light generated in the resonator 40 may be emitted outward from the resonator 40. This will be described in detail later. In light of these functions of the first decoupler 42, the first decoupler 42 may be described as a light splitter, a light separating element, a light separating member, and a light separating structure, and a region including the first decoupler 42 may be expressed as a visible light radiation region. As the resonator 40 includes a nonlinear optical material, when the wavelength of light (e.g., infrared light) introduced into the resonator 40 from the waveguide 70 corresponds to the resonant wavelength of the resonator 40, second harmonics that are visible light may be generated inside the resonator 40. The second harmonics may be emitted outward from the resonator 40 by the first decoupler 42. As a result, the visible light emitted outward from the resonator 40 by the first decoupler 42 may have the second harmonics. The first decoupler 42 may be positioned within a harmonic resonance distance whether the second harmonics are reached.

Figure 13:
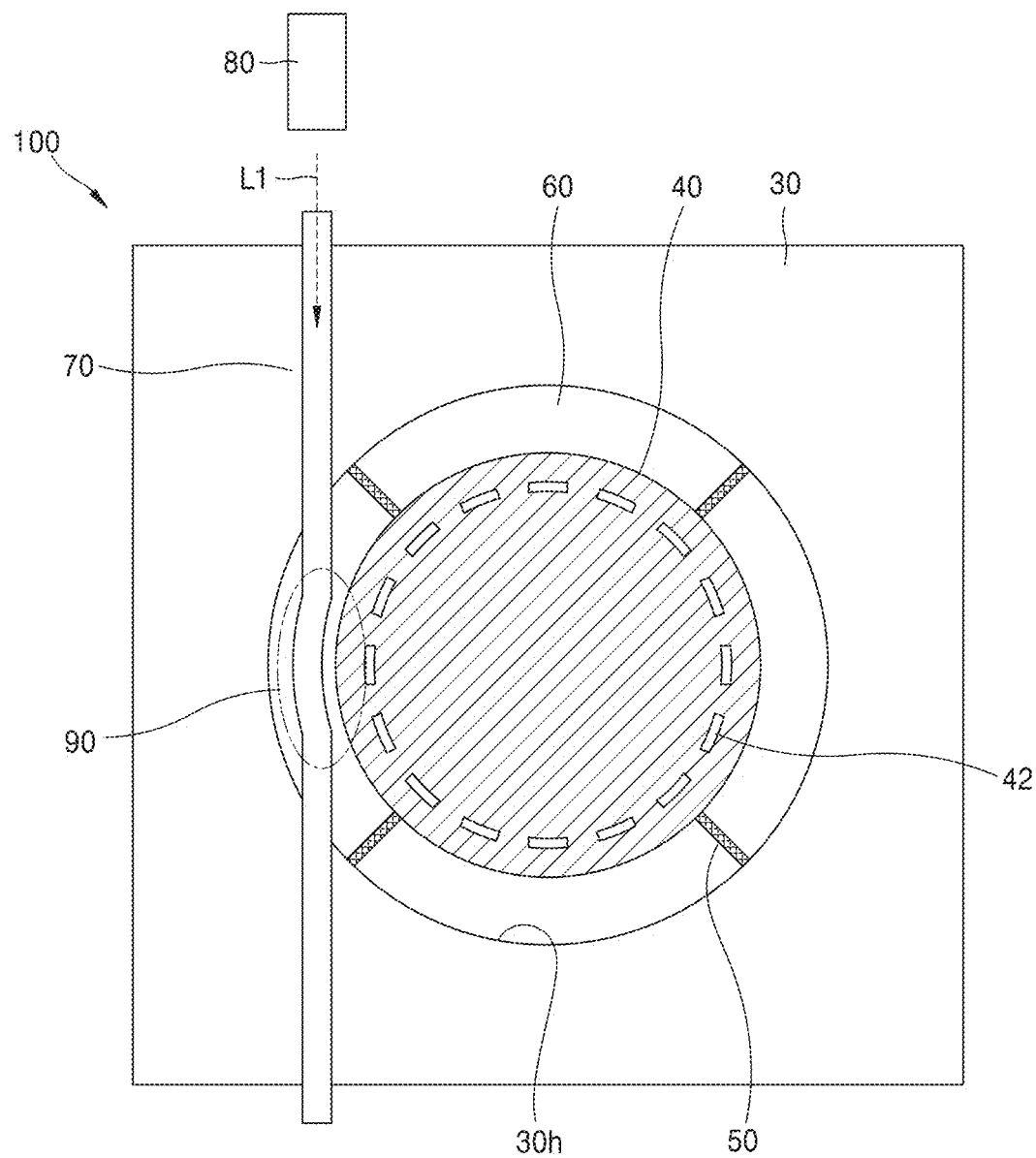
FIG. 13 is a plane view of a case where a waveguide of an optical coupling region is curved in the first thermal sensor of FIG. 1.

While the entre waveguide 70 may be provided in a straight line, it is not limited to such an arrangement. For example, as shown in FIG. 13, some section of the waveguide 70 may have a curved form. The waveguide 70 may function as a conduit conveying a part of first light emitted from the light source 80 to the thermal sensor 100. For example, the waveguide 70 may be arranged such that a part of the waveguide 70 passes between the resonator 40 and the boundary of the through-hole 30$h$. The part of the waveguide 70 may be close to the resonator 40. In an example, the waveguide 70 may be disposed in proximity to the resonator 40 such that optical coupling may occur between the waveguide 70 and the resonator 40. Thus, light leaking from the waveguide 70 may enter the resonator 40. The light leaking from the waveguide 70 may be evanescent light having an intensity decreasing exponentially. Reference numeral 90 may indicate a region where optical coupling occurs between the waveguide 70 and the resonator 40 due to the evanescent light. In a region 90 where optical coupling occurs, a gap or a separation distance between the waveguide 70 and the resonator 40 may be less than a distance between the boundary of the through-hole 30h and the resonator 40.

In an example, a material (substance) of the waveguide 70 may be or include a nonlinear optical material (substance). In an example, the material of the waveguide 70 may be different from or the same as the material of the resonator 40. The waveguide 70 may be thermally stabilized. That is, the total temperature of the waveguide 70 may be substantially constant. Thus, the waveguide 70 may not affect an operation of the resonator 40. In an example, the nonlinear optical material of the waveguide 70 may include a silicon nitride but be not limited to there.

The light source 80 may be arranged at an end of the waveguide 70. The light source 80 may be directly or optically connected to an end of the waveguide 70. The light source 80 may be provided in the waveguide 70 to supply first light L1. In an example, the first light L1 may include light in an infrared band. In an example, the light source 80 may include a structure for radiating near-infrared light into the waveguide 70. In an example, the light source 80 may include a laser for radiating near-infrared light as the first light L1. In an example, an operation of the light source 80 may be controlled in real time by a controller. In an example, a wavelength of the first light L1 radiated from the light source 80 may be tuned in real time according to an operation of the resonator 40. That is, the wavelength of the first light L1 radiated from the light source 80 may be variable in real time. In an example, a variable range of the wavelength of the first light L1 may include a variable range of a resonant wavelength of the resonator 40. For example, when the resonant wavelength of the resonator 40 is changed as the outside light is incident onto the resonator 40, the wavelength of the first light L1 radiated from the light source 80 may be adjusted to correspond to the changed resonant wavelength of the resonator 40. Such adjustment may be possible by sweeping the light source 80 to the possible resonant wavelength range of the resonator 40.

A plurality of thermally insulating bridges 50 are provided between the boundary of the through-hole 30h and the resonator 40. The thermally insulating bridges 50 may be arranged separated from each other in a rotation direction. In an example, the thermally insulating bridges 50 may be provided perpendicularly to each other, but arrangement thereof is not limited thereto. In an example, the thermally insulating bridges 50 may be provided such that two adjacent bridges form an acute angle. The thermally insulating bridges 50 may be provided to connect the resonator 40 to the substrate 30. In an example, the thermally insulating bridges 50 may have such low thermal conductivity as to minimize a loss of heat generated in the resonator 40 as the outside light is incident onto the resonator 40. Thus, as the outside light is incident onto the resonator 40, heat generated in the resonator 40 may be accumulated in the resonator 40 without leaking, such that a temperature change in the resonator 40 may be greater than a case with leakage of heat. This may directly lead to improved sensitivity of the thermal sensor 100. The thermally insulating bridges 50 may have low thermal conductivity, but excessively low thermal conductivity may be avoided. That is, heat accumulated in the resonator 40 may be transmitted to the substrate 30 after a certain time to prevent the heat accumulated in the resonator 40 from staying in the resonator 40 too long. A material of the thermally insulating bridges 50 may be selected considering these points. In an example, the material of the thermally insulating bridges 50 may be the same as the material of the substrate 30, without being limited thereto. In an example, the thermally insulating bridges 50 may include, but not limited to, a silicon oxide. The thermally insulating bridges 50 may be a member (support) supporting the resonator 40.

Figure 2:
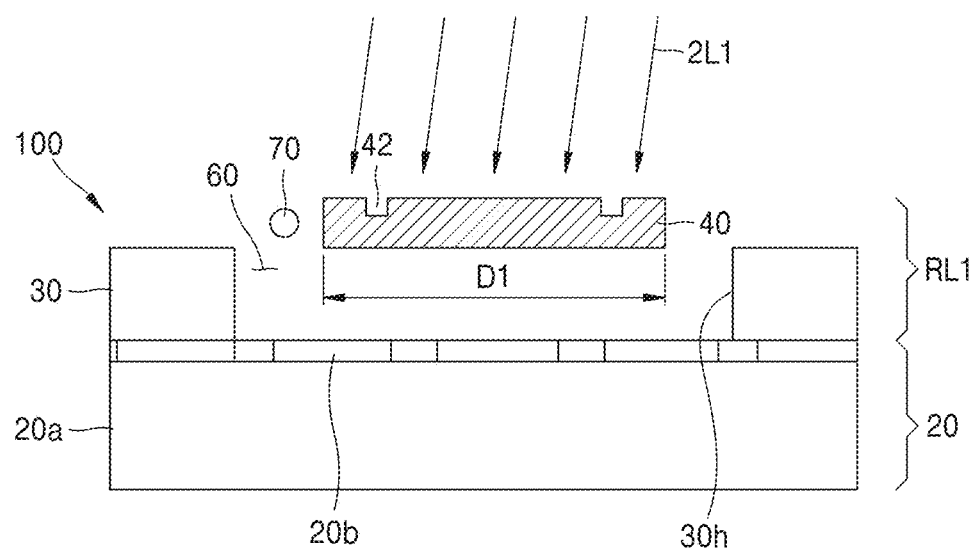
FIG. 2 is a cross-sectional view of the first thermal sensor of FIG. 1 cut in a direction 2-2'.

FIG. 2 is a cross-sectional view of the first thermal sensor of FIG. 1 cut in a direction 2-2'.

Referring to FIG. 2, the first thermal sensor 100 may further include an image sensor 20 and a resonator layer RL1 that are sequentially stacked. The image sensor 20 may be or include a complementary metal-oxide semiconductor (CMOS) image sensor. In an example, the image sensor 20 may be a black/white image sensor or a color image sensor. The image sensor 20 may include a substrate 20a including a readout integration circuit (ROIC) and a plurality of pixels 20b provided thereon. In an example, each pixel 20b may or may not include a color filter. In an example, each pixel 20b may include a meta structure layer that performs color separation and light collecting (focusing) in place of a color filter. In an example, the meta structure layer may also perform a role of a micro-lens. Accordingly, when each pixel 20b includes the meta structure layer, each pixel 20b may not include both a micro-lens and a color filter.

The resonator layer RL1 may be expressed as a bolometer resonator layer in that the thermal sensor 100 senses or detects infrared light like a bolometer. The resonator layer RL1 may include the substrate 30 and the resonator 40 described with reference to FIG. 1. In an example, the resonator light RL1 may include the light source 80 and the waveguide 70.

The resonator 40 provided between the substrates 30 may be separated from the image sensor 20. The resonator 40 may be separated from the substrate 30 horizontally. The resonator 40 may have a first thickness t1 and a first diameter D1. The first thickness t1 and a radius D½ of the resonator 40 may be related to radiation of the second harmonics, which are the visible light generated in the resonator 40, to the outside of the resonator 40 through the first decoupler 42. Thus, during a manufacturing process of the thermal sensor 100, the first thickness t1 and the first diameter D1 of the resonator 40 may be set based on generation of the second harmonics in the resonator 40.

The first decoupler 42 of the resonator 40 may be, but not limited to, a concave pattern (an engraved pattern) formed in a top surface of the resonator 40. The first decoupler 42 may be a diffraction grating. Thus, light incident onto the first decoupler 42 may be diffracted and radiated to the outside of the resonator 40. Second light 2L1 incident onto the first thermal sensor 100 from outside of the first thermal sensor 100 may be the outside light as described above. The second light 2L1 may be incident onto the entire top surface on which the first decoupler 42 is formed. Thus, the entire top surface of the resonator 40 may be expressed as a region to which the second light 2L1 is incident. The second light 2L1 may belong to the infrared region mentioned in the description of FIG. 1.

Figure 3:
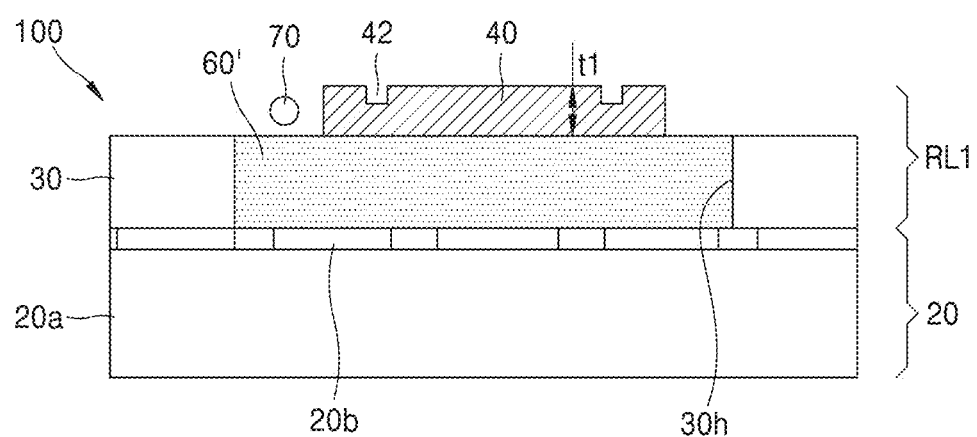
FIG. 3 is a cross-sectional view of the first thermal sensor when a thermally insulating layer of FIG. 2 is filled with a thermally insulating material layer.

In FIG. 2, the thermally insulating layer 60 between the substrates 30 and under the resonator 40 may be vacuum (layer) or an air layer, but as shown in FIG. 3, the thermally insulating layer 60 may be filled with a thermally insulating material layer 60' that is not gaseous. In this case, the resonator 40 may be provided on the thermally insulating material layer 60'. In an example, a material and thermal conductivity of the thermally insulating material layer 60' may correspond to those of the thermally insulating bridges 50 described with reference to FIG. 1.

Figure 4:
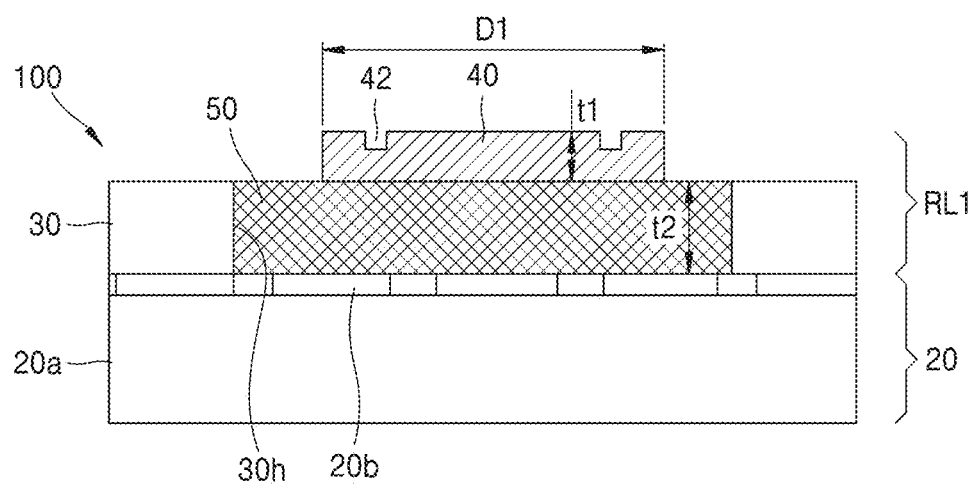
FIG. 4 is a cross-sectional view of the first thermal sensor of FIG. 1 cut in a direction 4-4'.

FIG. 4 shows an example of a cross-section of the first thermal sensor of FIG. 1 cut in a direction 4-4'. A part different from FIG. 2 will be described.

Referring to FIG. 4, in the resonator layer RL1, the thermally insulating bridge 50 may be provided between the substrates 30 and under the resonator 40. The thermally insulating bridge 50 may be directly connected to the substrate 30. The thermally insulating bridge 50 may directly contact a bottom surface of the resonator 40. The resonator 40 may be supported by the thermally insulating bridge 50. The thermally insulating bridge 50 may be provided to continuously cross the bottom surface of the resonator 40 from one side to the other. The thermally insulating bridge 50 may contact the bottom surface of the resonator 40 thereon and contact the image sensor 20 thereunder. A thickness t2 of the thermally insulating bridge 50 may be the same as a thickness of the substrate 30. A height of the thermally insulating bridge 50 may be the same as a height of the substrate 30.

Referring to FIGS. 1 and 4 together, the thermally insulating bridge 50 may be regarded as a result (a structure) of a part of the substrate 30 extending into the through-hole 30h.

Figure 5:
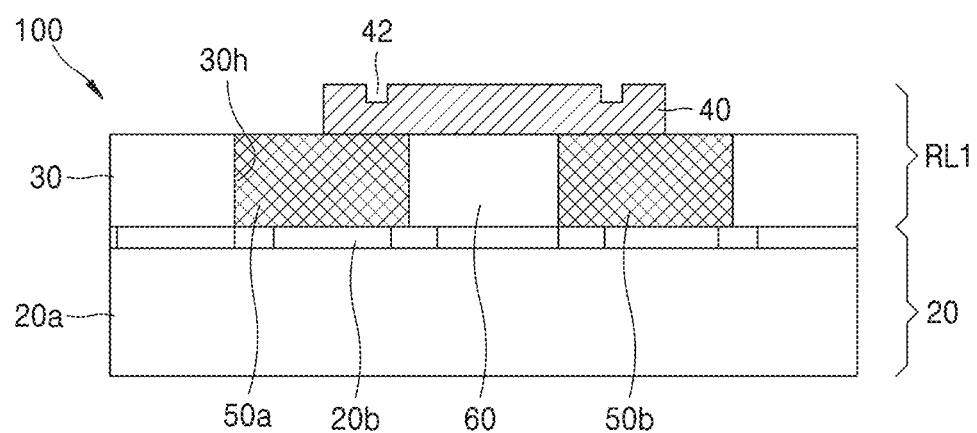
FIG. 5 is a cross-sectional view of a case where a thermally insulating bridge of FIG. 4 is divided into two separated parts.

In an example, the thermally insulating bridge 50 may have a structure not crossing the entire bottom surface of the resonator 40 as shown in FIG. 5.

Figure 6:
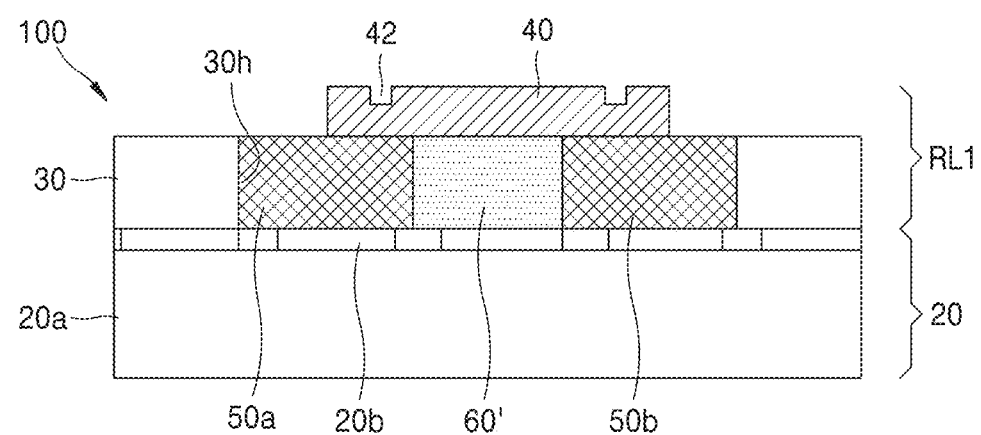
FIG. 6 is a cross-sectional view of a case where a thermally insulating layer of FIG. 5 is filled with a thermally insulating material layer.

Referring to FIG. 5, the thermally insulating bridge 50 may be divided into a first part 50a and a second part 50b that are separated from each other. The first part 50a may contact a part of the bottom surface of the resonator 40, and the second part 50b may contact another part of the bottom surface of the resonator 40. The first part 50a and the second part 50b under the resonator 40 may be separated from each other. Under the resonator 40, the thermally insulating layer 60 between the first part 50a and the second part 50b of the thermally insulating bridge 50 may be a gas layer or vacuum (layer), but the thermally insulating layer 60 may be filled with a solid thermally insulating material layer 60' as shown in FIG. 6.

Figure 7:
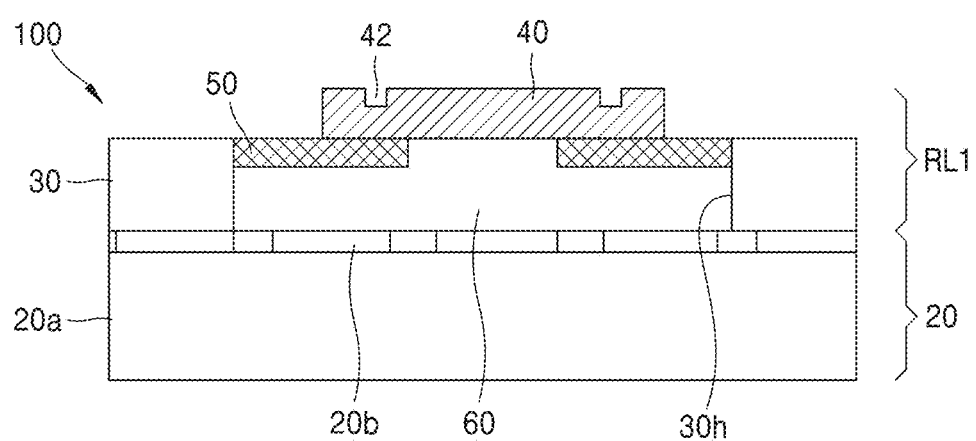
FIG. 7 is a cross-sectional view of a case where a thermally insulating bridge of FIG. 5 is separated from an image sensor.

In an example, the first part 50a and the second part 50b of the thermally insulating bridge 50 of the first thermal sensor 100 shown in FIG. 5 may be provided separated from the image sensor 20 as shown in FIG. 7.

Referring to FIG. 7, the first part 50a and the second part 50b may be separated from the image sensor 20 while maintaining the contact with the bottom surface of the resonator 40. As a result, a thickness of the first part 50a and the second part 50b of the thermally insulating bridge 50 may be less than the thickness of the substrate 30.

Figure 8:
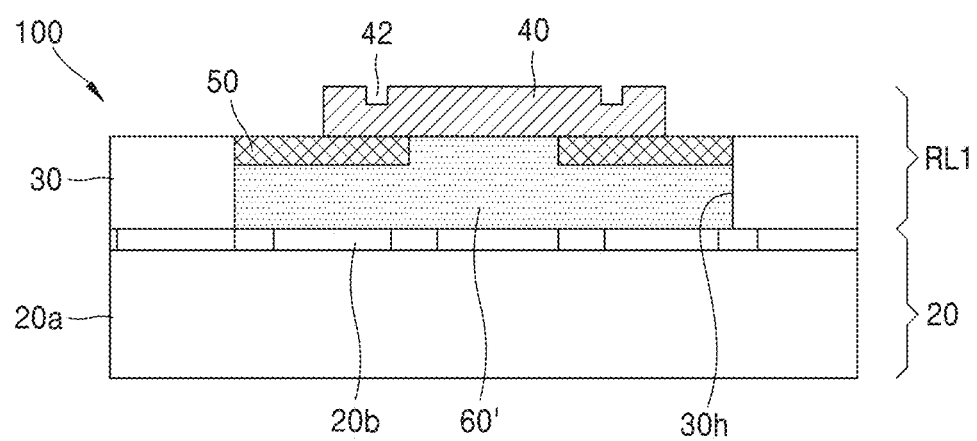
FIG. 8 is a cross-sectional view of a case where a thermally insulating layer of FIG. 7 is filled with a thermally insulating material layer.

In FIG. 7, the thermally insulating layer 60 may be a gas layer or vacuum (layer), but the thermally insulating layer 60 may be filled with the thermally insulating material layer 60 that is solid as shown in FIG. 8.

Figure 9:
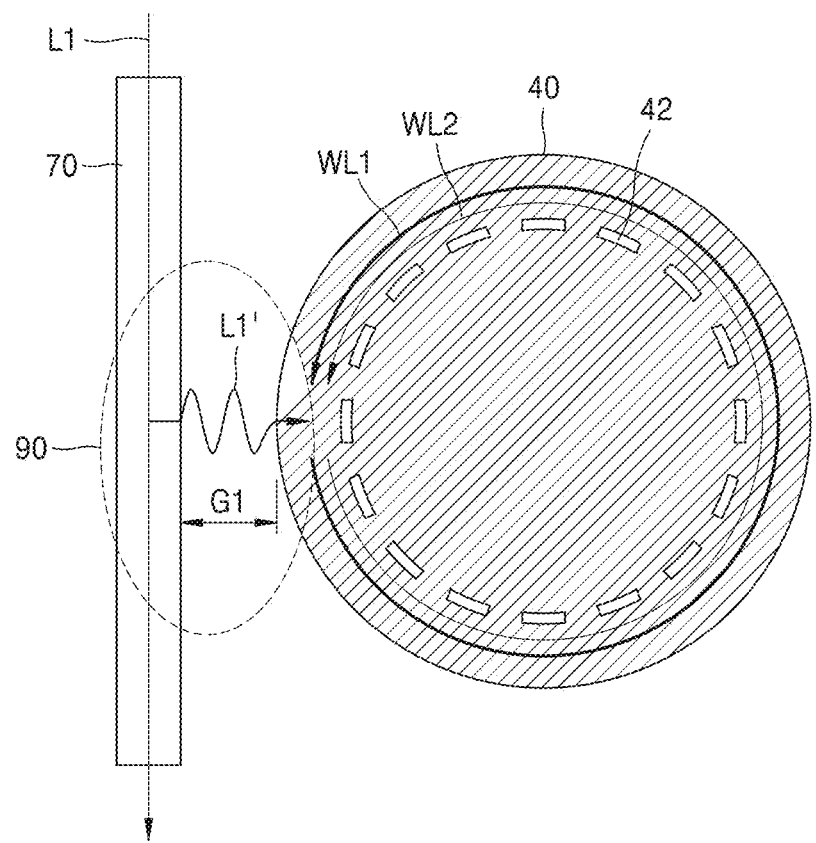
FIG. 9 is a plane view of a case where, in an optical coupling region where a waveguide of a thermal sensor according to an embodiment and a microresonator are located close to each other, light leaking from the waveguide enters the microresonator and circulated light is generated in the microresonator as the light enters the microresonator.

FIG. 9 is a plane view showing a case where light L1' enters the resonator 40 from the waveguide 70 in an optical coupling region 90. The light L1' may leak from the waveguide 70 and enter the resonator 40 in a region where the waveguide 70 and the resonator 40 are close to each other, and may be, for example, evanescent light having an intensity exponentially decreasing from the waveguide 70 toward the resonator 40. As a result, in the optical coupling region 90, the waveguide 70 and the resonator 40 may be optically coupled through the evanescent light. The optical coupling between the waveguide 70 and the resonator 40 through the light L1' may occur when a gap G1 of the region where the waveguide 70 and the resonator 40 are close to each other falls within a given range. In an example, the gap G1 may be, but not limited to, about 500 nm.

In an example, the light L1' may be light of an infrared region, e.g., near-infrared light. A wavelength of the light L1' may be variable and correspond to the resonance wavelength of the resonator 40. That is, when the temperature of the resonator 40 changes due to a thermo-optic effect, the resonant wavelength of the resonator 40 may also be changed. In an example, when the second light 2L1 of the infrared region is incident onto the resonator 40, the temperature of the resonator 40 may increase, and thus the resonant wavelength of the resonator 40 may increase when compared to a resonant wavelength thereof before incidence of the second light 2L1. That is, the resonant wavelength may be shifted. Through such a shift of the resonant wavelength, the wavelength of the first light L1 radiated into the waveguide 70 from the light source 80 may also be adjusted properly for the resonant wavelength. As a result, when the resonant wavelength of the resonator 40 is shifted, the wavelength of the light L1' entering the resonator 40 from the waveguide 70 in the optical coupling region 90 may also be adjusted appropriately for the shifted resonant wavelength of the resonator 40.

When the wavelength of the light L1' entering the resonator 40 from the waveguide 70 corresponds to (coincides with or matches) the resonant wavelength of the resonator 40 in the optical coupling region 90, the light L1' may enter the resonator 40 and propagate while circulating in any one direction (e.g., a counterclockwise direction) through internal total reflection along an edge region (a border region) of the resonator 40. In this case, the light L1' may propagate in a first whispering gallery mode inside the resonator 40. Reference numeral WL1 may indicate first circulated light circulated in the edge region of the resonator 40 in the first whispering gallery mode. The first circulated light WL1 may have a fundamental mode of the first light L1 radiated from the light source 80, and may have the same wavelength as that of the first light L1. As the light L1' corresponding to the resonant wavelength of the resonator 40 enters the resonator 40 in the optical coupling region 90, second circulated light WL2 may be generated together with the first circulated light WL1. The second circulated light WL2 may correspond to a second harmonic component of the light L1' entering the resonator 40. The second circulated light WL2 may propagate in a whispering gallery mode of a higher order, and for example, the second circulated light WL2 may propagate in a second whispering gallery mode. The wavelength of the second harmonic component may correspond to ½ of the wavelength of the light L1'. The wavelengths of the light L1' and the first circulated light WL1 may be the same as each other and belong to a near-infrared region. Thus, the wavelength of the second circulated light WL2 corresponding to the second harmonic component may belong to a visible light band. That is, the second circulated light WL2 may be visible light. For example, when the wavelength of the light L1' is about 1200 nm, the wavelength of the second circulated light WL2 corresponding to the second harmonics may be about 600 nm.

When effective refractive indices of the first circulated light WL1 and the second circulated light WL2 coincide with each other and resonant spectra thereof also coincide with each other in the resonator 40, the second circulated light WL2 may be radiated to the outside of the resonator 40 through the first decoupler 42.

Figure 10:
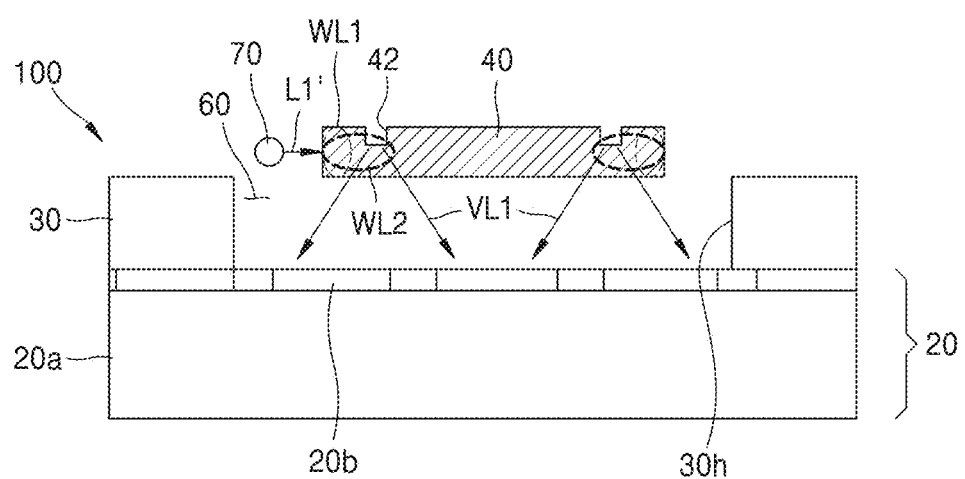
FIG. 10 is a cross-sectional view of a case where visible light is radiated from a decoupler of the microresonator of FIG. 9 and is incident onto an image sensor under the microresonator.

FIG. 10 shows an example of such radiation.

FIGS. 9 and 10 will be referred to together.

Intensity distribution of the first circulated light WL1 and intensity distribution of the second circulated light WL2 seen in a cross-section perpendicular to the traveling direction of the first circulated light WL1 and the second circulated light WL2 may decrease toward a center of the resonator 40. The first circulated light WL1 may be between the first decoupler 42 and the edge of the resonator 40, but the intensity distribution thereof may end before the first decoupler 42. That is, the first circulated light WL1 may not reach the first decoupler 42.

On the other hand, the second circulated light WL2 may be between the first decoupler 42 and the edge of the resonator 40, but may be inward from the first circulated light WL1, and the intensity distribution of the second circulated light WL2 may reach the first decoupler 42. That is, the second circulated light WL2 may reach the first decoupler 42. The second circulated light WL2 reaching the first decoupler 42 may be separated by the first decoupler 42 and radiated to the outside of the resonator 40. That is, the second circulated light WL2 may be diffracted by the first decoupler 42 and radiated to the outside of the resonator 40. In an example, the first decoupler 42 may be patterned such that the second circulated light WL2 radiated by the first decoupler 42 is radiated below the resonator 40. Thus, in an operating process of the first thermal sensor 100, visible light VL1 radiated from a region of the resonator 40 where the first decoupler 42 is provided may be incident onto the image sensor 20. When the visible light VL1 is received by the image sensor 20 from the resonator 40, it may mean that resonance occurs between the light L1' introduced into the resonator 40 and the resonator 40 in the optical coupling region 90. The wavelength of the first light L1 radiated from the light source 80 may be known through a controller connected to the light source 80, and thus the resonant wavelength of the resonator 40 may also be known.

As the infrared light as an outside light is incident onto the top surface of the resonator 40, the temperature of the resonator 40 may increase and the resonant wavelength of the resonator 40 may be changed. The wavelength of light radiated from the light source 80 may be swept in a range of possible resonant wavelengths of the resonator 40 using the controller. By a process of sweeping the wavelength of light radiated from the light source 80, light having a wavelength corresponding to the changed resonant wavelength of the resonator 40 may be incident from the waveguide 70 to the resonator 40 and, as described above, the visible light VL1 may be radiated to the image sensor 20 in the region of the resonator 40 where the first decoupler 42 is provided. Sweeping of the wavelength of the light radiated from the light source 80 and reception of visible light by the image sensor 20 may be performed in real time, such that the wavelength of the light L1' introduced into the resonator 40 corresponding to the changed resonant wavelength of the resonator 40 may be known. That is, after the resonant wavelength of the resonator 40 is changed by incidence of the infrared light, the visible light radiated from the resonator 40 may be received and the changed resonant wavelength of the resonator 40 may be known. In other words, before and after infrared light is incident onto the top surface of the resonator 40, the visible light VL1 radiated from the resonator 40 may be received and the resonant wavelength of the resonator 40 for each case may be measured, such that the degree of movement of the resonant wavelength of the resonator 40, i.e., the shift of the resonant wavelength thereof with respect to incidence of the infrared light to the resonator 40 may be known. The shift of the resonant wavelength of the resonator 40 may increase in proportional to an intensity of an outside light such as an infrared light incident onto the top surface of the resonator 40. Thus, by measuring the shift of the resonant wavelength of the resonator 40, the intensity of infrared light incident onto the top surface of the resonator 40 may be measured and a relative intensity of the infrared light may be known. As the infrared light is incident onto the top surface of the resonator 40, the temperature of the resonator 40 may increase with the shift of the resonant wavelength of the resonator 40. Thus, data about the degree of temperature change of the resonator 40 may be obtained from the shift of the resonant wavelength of the resonator 40, and the temperature of the resonator 40 after incidence of infrared light may be known from the data.

This case may be equally applied to each thermal sensor when a plurality of first thermal sensors 100 are provided.

The resonator 40 may be positioned to correspond to or align with a plurality of pixels of the image sensor 20. For example, the resonator 40 may be positioned correspond to or align with at least two pixels 20b. Thus, the visible light VL1 radiated down from the first decoupler 42 of the resonator 40 may be received by the plurality of pixels 20b under the resonator 40. As such, the visible light VL1 radiated from the resonator 40 may be received by the image sensor 20, and thus the resonator 40 and the image sensor 20 may be regarded as being optically coupled together.

Figure 11:
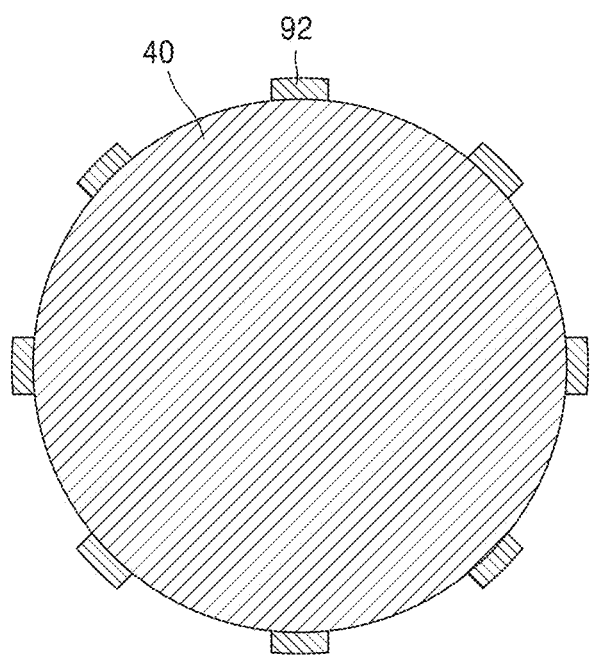
FIGS. 11 and 12 are plane views of another example of a decoupler of a microresonator of a thermal sensor according to an embodiment.
Figure 12:
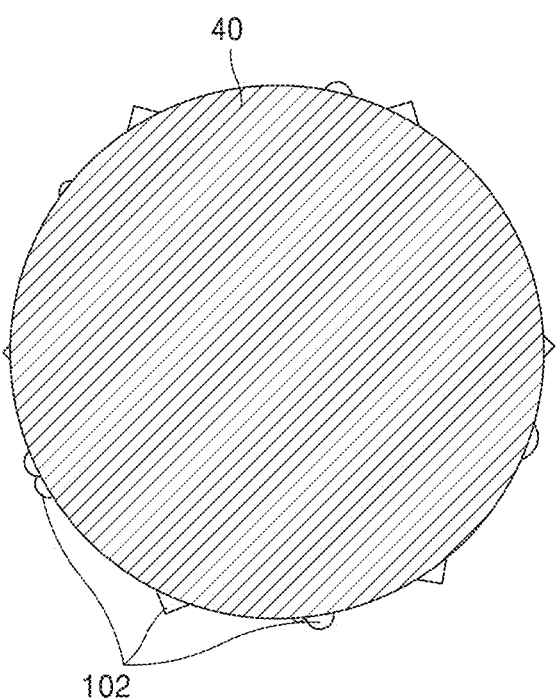

In an example, the first decoupler 42 of the resonator 40 may be provided at another position. FIG. 11 shows an example thereof.

Referring to FIG. 11, the resonator 40 may include a second decoupler 92 in place of the first decoupler at an edge of the resonator 40. The second decoupler 92 may play the same role as the first decoupler 42. The second decoupler 92 may protrude from an edge of the resonator 40 outwardly from the resonator 40. When viewed from a plan view, the second decoupler 92 may face the outside of the resonator 40, protrude from the edge of the resonator 40 in a direction perpendicular to the edge, and be a plurality of patterns separated from each other. The second decoupler 92 may be arranged along the edge of the resonator 40 and may be separated from each other. In an example, the second decoupler 92 may be a diffraction grating. In an example, a material of the second decoupler 92 may be the same as the material of the resonator 40, without being limited thereto. The second decoupler 92 may be a result of a portion of the resonator 40 protruding outwardly from the resonator 40, and thus the second decoupler 92 and the resonator 40 may be a single body having no physical boundary therebetween.

In an example, the resonator 40 may omit the first decoupler 42 or the second decoupler 92. Instead, the resonator 40 may have an irregular and rough texture along the periphery of the resonator 40, which is labeled as a natural pattern 102. The natural pattern 102 may arise during the formation process of the resonator 40, rather than being added as a planned pattern, resulting non-flat or non-uniform surface irregularities. Thus, the form or characteristic of each instance of the natural pattern 102 may vary, and a distribution of these natural patterns 102 may not be consistent.

In the optical coupling region 90 of the waveguide 70 and the resonator 40 of FIG. 1, the waveguide 70 may not be linear. In an example, as shown in FIG. 13, the waveguide 70 may be bent along a curved shape of the edge of the resonator 40 in the optical coupling region 90. That is, in the optical coupling region 90, the waveguide 70 may be curved.

Figure 14:
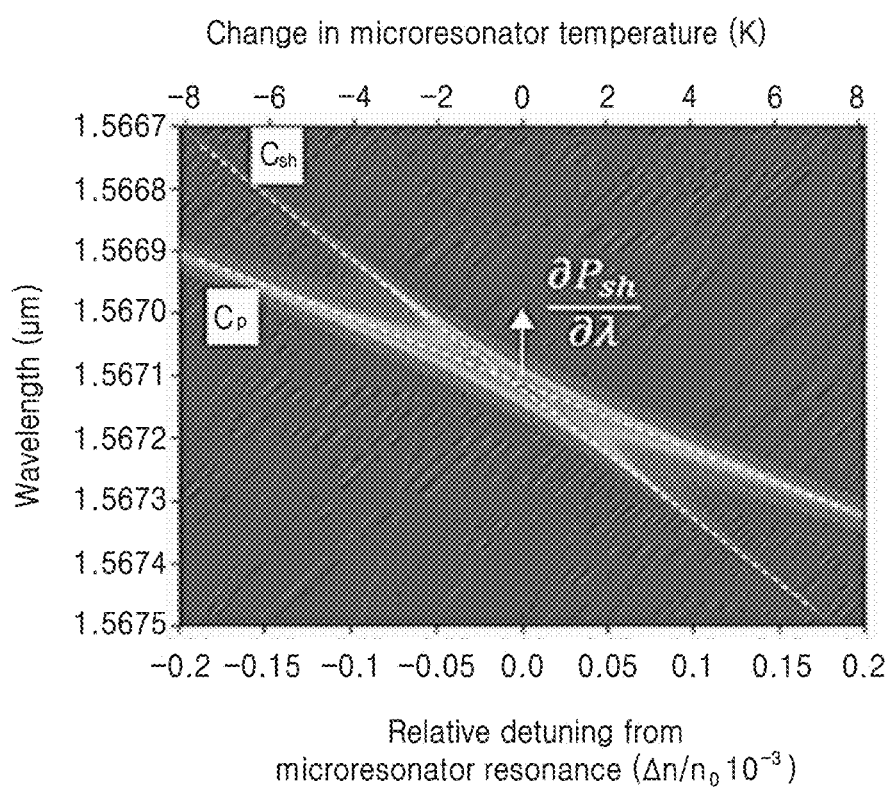
FIG. 14 is a graph of harmonic generation efficiency of a thermal sensor according to an embodiment.

FIG. 14 is a graph of a harmonic generation efficiency of a thermal sensor according to an embodiment.

In FIG. 14, a y-axis may represent a wavelength of light (infrared laser) radiated from the light source 80 to the waveguide 70, and an x-axis may represent relative detuning (mistuning) from the resonant wavelength of the resonator 40.

On the x-axis, n0 indicates an effective refractive index when (1) phase matching is made between the first circulated light WL1 and the second circulated light WL2, that is, propagation phases of the first circulated light WL1 and the second circulated light WL2 are the same as each other and (2) the resonant spectrum of the first circulated light WL1 and the second circulated light WL2 coincides with the resonant spectrum of the resonator 40. (1) and (2) may be conditions for generation of the second harmonics in the resonator 40.

$\Delta n/n_0$ may indicate relative detuning from resonance in which $\Delta n$ may indicate a change of an effective refractive index originating from an external factor, e.g., a temperature change. In other words, the lower x-axis may represent a resonance deviation measure of the resonator 40 from a state where the both conditions for harmonic generation (the same effective refractive indices, coincidence of the resonant spectra) are simultaneously satisfied.

The upper x-axis may represent a temperature change of the resonator 40 (a temperature change due to a thermo-optic effect) due to external light (infrared light) incident onto the resonator 40 in which the temperature change may provide detuning for resonance of the resonator 40. That is, the temperature change may cause the change of the resonant wavelength of the resonator 40.

In FIG. 14, two dotted lines ($C_{sh}$ and $C_p$) may indicate the change of the resonant wavelength (resonant circuit maxima) as a function of the refractive index change. Reference numeral $C_p$ may indicate a first resonant circuit for light radiated from the light source 80. In $C_p$, the subscript "p" may mean pumping.

Reference numeral $C_{sh}$ may indicate a second resonant circuit for the second harmonics generated in the resonator 40. In $C_{sh}$, the subscript "sh" may indicate the second harmonics.

Referring to the first and second resonant circuits ($C_p$, $C_{sh}$), the first and second resonant circuits ($C_p$, $C_{sh}$) intersect each other at a point where resonant detuning of the resonator 40 is 0. This may indicate coincidence of the resonant spectra (resonant wavelengths) of the first circulated light WL1 and the second circulated light WL2 generated in the resonator 40. In this case, the first and second resonant circuits ($C_p$, $C_{sh}$) are the dependence of a power of a light wave stored in the resonator 40 on the wavelength thereof.

When the wavelength of light introduced into the resonator 40 from the waveguide 70 is equal to the resonant wavelength of the resonator 40, the power of the light wave stored in the resonator 40 may be maximum and drop off rapidly at both sides thereof.

The first and second resonant circuits ($C_p$, $C_{sh}$) may be determined by drawing a cross section of a corresponding graph with a vertical line.

For example, when a section line for a cross section is set by a line T=6 K for the temperature change of the resonator 40 and the dependence of color on the wavelength is illustrated, then two peaks (two resonant circuits), i.e., a strong value and a weak value may be obtained on such a graph.

As the section line approaches the center, these peak values (the strong value and the weak value) may be close to each other, and may coincide with each other exactly in the center (where $\Delta n=0$).

A harmonic generation efficiency in the resonator 40 may be determined by a product of the first and second resonant circuits ($C_p$, $C_{sh}$).

When both conditions (1) and (2) for harmonic generation are satisfied and $\Delta n=0$, the generation spectrum may be a product of a square of the first resonant circuit $C_p$ and the second resonant circuit $C_{sh}$.

In the case of a very small temperature change of the resonator 40, and hence a very weak detuning from the resonance in the resonator 40, the sensitivity of the first thermal sensor 100 may be determined by a derivative of the resonant circuit of the generation efficiency with respect to the wavelength.

For example, when the temperature of the resonator 40 by incidence of an outside infrared on the resonator 40 increases by 1 degree (upper x-axis), the shift of the resonant wavelength (the resonant shift) of the resonator 40 may be less than 0.1 nm (vertical y-axis), and the harmonic generation efficiency, i.e., the power of the visible signal detected by a photodetector may drop in $\frac{1}{10}$.

As a result, for the first thermal sensor 100 including the resonator 40 formed of a nonlinear optical material, even when a small amount of infrared light is incident onto the first thermal sensor 100 from the outside, the first thermal sensor 100 may react sensitively. In other words, even when the amount of infrared light incident onto the first thermal sensor 100 from the outside changes a little, the first thermal sensor 100 may react sensitively. This may mean improvement of sensitivity of the first thermal sensor 100 to infrared light.

Figure 15:
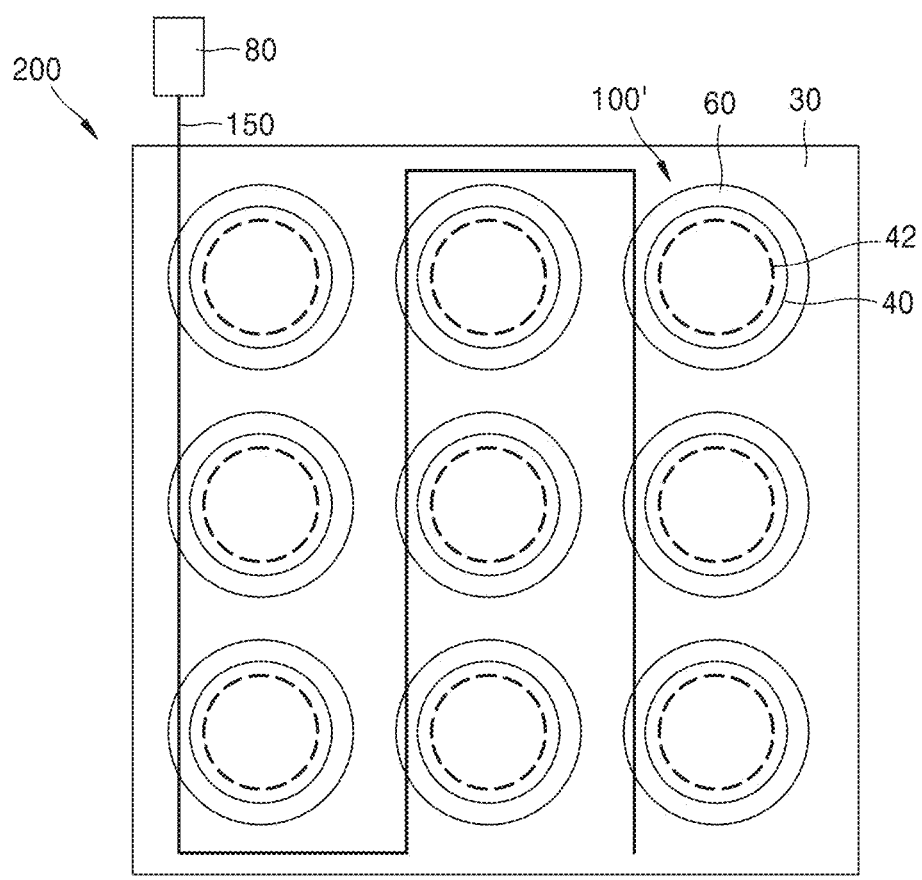
FIG. 15 is a plane view of a first thermal sensor according to an embodiment.

FIG. 15 shows a first thermal sensor array 200 according to an embodiment.

While it is shown that the first thermal sensor array 200 includes nine thermal sensors for convenience, the first thermal sensor array 200 may include nine or less or nine or more thermal sensors 100'. The first thermal array sensor 200 may include a plurality of thermal sensors 100' to form a thermal image like an infrared image. Each thermal sensor 100' included in the first thermal sensor array 200 may be the thermal sensor 100 according to the above-described embodiment. In each thermal sensor 100' of the thermal sensor array 200, a thermally insulating bridge is omitted for convenience of illustration. The nine thermal sensors 100' may be formed on one substrate 30. In other words, the nine thermal sensors 100' may share one substrate 30.

The thermal sensor array 200 may include one light source 80 and one waveguide 150 shared by all thermal sensors 100'. In an example, the waveguide 150 may be the waveguide 70 described with reference to FIG. 1. A side of the waveguide 150 may be connected to the light source 80 such that light (e.g., laser light) radiated from the light source 80 may enter the waveguide 150. The waveguide 150 may be arranged close to all thermal sensors 100'. A region where the waveguide 150 and each thermal sensor 100' are close to each other may be an optical coupling region. That is, the waveguide 150 may be arranged to form optical coupling with all thermal sensors 100'.

Figure 16:
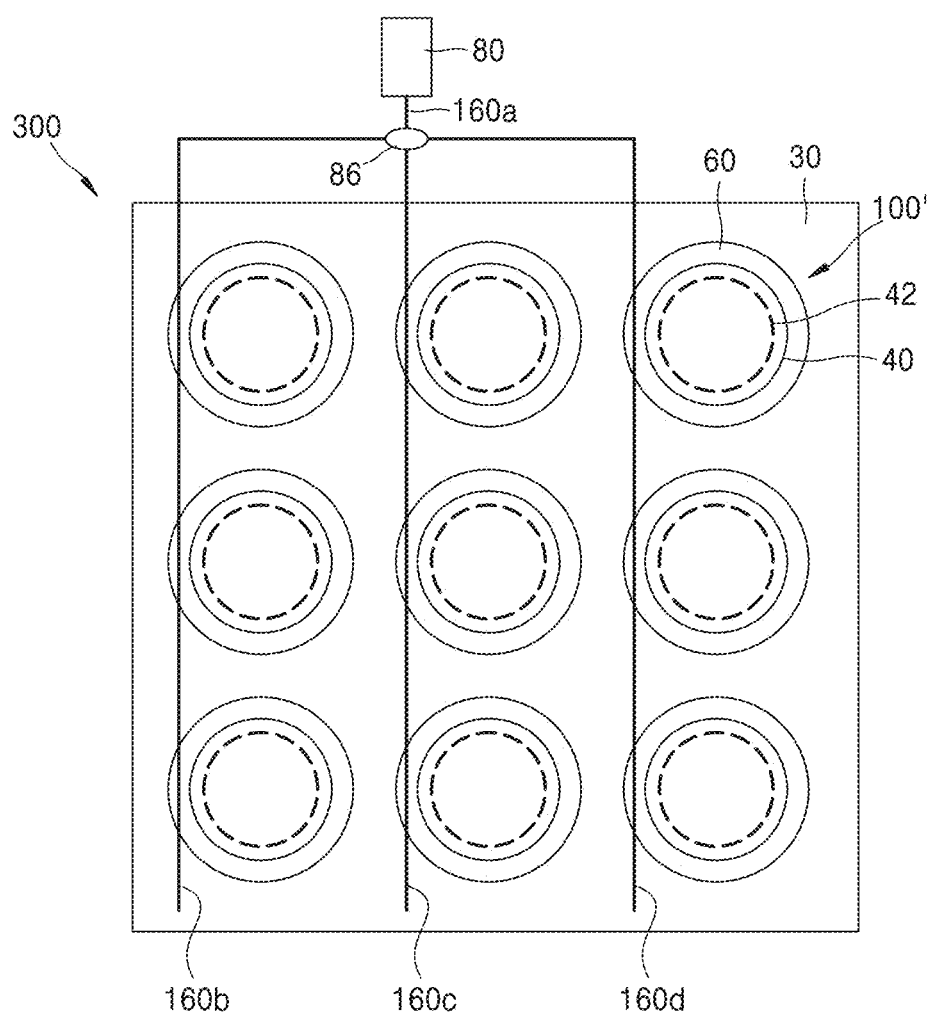
FIG. 16 is a plane view of a second thermal sensor according to an embodiment.

FIG. 16 shows a second thermal sensor array 300 according to an embodiment. A part that is different from the first thermal sensor array 200 of FIG. 15 will be described. The same reference numeral as that described above indicates the same member and a description thereof will be omitted.

Referring to FIG. 16, the number, configuration, arrangement and layout of the plurality of thermal sensors 100' included in the second thermal sensor array 300 may be the same as those of the first thermal sensor array 200. However, the second thermal sensor array 300 may include a plurality of waveguides 160a, 160b, 160c, and 160d that are separated from one another. Moreover, the second thermal sensor array 300 may include a splitter 86 at an interconnection point of the plurality of waveguides 160a to 160d. The splitter 86 may be an example of a light splitter or a light distributor that divides light supplied through the first waveguide 160a into a plurality of different paths. The first waveguide 160a may be provided between the light source 80 and the splitter 86. One of opposite ends of the first waveguide 160a may be directly or optically connected to the light source 80. The other side of the opposite ends of the first waveguide 160a may be directly or optically connected to the splitter 86. The splitter 86 may be arranged between the first waveguide 160a and the second to fourth waveguides 160b to 160d. One sides of the second to fourth waveguides 160b to 160d may be directly or optically connected to the splitter 86. The second waveguide 160b may be arranged to correspond to a first column of the second thermal sensor array 300 (the first column of the second thermal sensor array 300 from the left). That is, the second waveguide 160b may be arranged to be shared among the thermal sensors 100' of the first column. An arrangement relationship between the second waveguide 160b and the thermal sensors 100' of the first column may be the same as that between the waveguide 150 of the first thermal sensor array 200 and the thermal sensors 100'. The third waveguide 160c may be arranged to correspond to a second column (the second column of the second thermal sensor array 300 from the left). An arrangement relationship between the third waveguide 160c and the thermal sensors 100' of the second column may be the same as that between the second waveguide 160b and the thermal sensors 100' of the first column. The third waveguide 160c may be arranged in parallel to the second waveguide 160b with the thermal sensors 100' of the first column therebetween. The fourth waveguide 160d may be arranged to correspond to a third column of the second thermal sensor array 300 (the third column of the second thermal sensor array 300 from the left or the first column from the right). A corresponding relationship or arrangement relationship between the fourth waveguide 160d and the thermal sensors 100' of the third column may be the same as that between the second waveguide 160b and the thermal sensors 100' of the first column. The fourth waveguide 160d may be parallel to the third waveguide 160c with the thermal sensors 100' of the second column therebetween.

Light transmitted from the light source 80 to the splitter 86 through the first waveguide 160a may be split as many as the number of waveguides 160b to 160d connected to the splitter 86 except for the first waveguide 160a. For FIG. 16, the light transmitted to the splitter 86 through the first waveguide 160a may be split into three light rays having different propagation paths at the same time. The divided three light rays each may enter the second to fourth waveguides 160b, 160c, and 160d at the same time. The first to fourth waveguides 160a to 160d may have the same material and cross-sectional configuration. Thus, light rays propagating through the second to fourth waveguides 160b to 160d may have the same phase and intensity.

In an example, the second to fourth waveguides 160b to 160d may be separately connected to the light source 80 through different paths. In an example, the second thermal sensor array 300 may include a plurality of light sources that are synchronized with each other and a plurality of splitters, and in this case, the number of splitters may be equal to the number of light sources.

An operation of one thermal sensor 100 described above may be equally applied to each thermal sensor 100' of the first and second thermal sensor arrays 200 and 300 shown in FIGS. 15 and 16. Thus, by sensing visible light radiated through a visible light radiation region of the resonator 40 of each thermal sensor 100' of the arrays 200 and 300, a shift of the resonant wavelength of the resonator 40 of each thermal sensor 100' may be known, from which a temperature change of the resonator 40 of each thermal sensor 100' and an intensity or relative intensity of infrared light incident onto the resonator 40 may be known. As a result, by using the first and second thermal sensor arrays 200 and 300, a temperature distribution and/or intensity distribution of light (e.g., infrared light) incident onto the first and second thermal sensor arrays 200 and 300 may be known on the first and second thermal sensor arrays 200 and 300. The temperature distribution or intensity distribution may correspond to a thermal image or infrared image of an object incident onto the thermal sensor arrays 200 and 300. The temperature distribution or intensity distribution may be stored as data which may then be transmitted to a display device, such that the thermal image or infrared image may be seen through the display device. In an example, the display device may include a fixed display device regarded as being substantially fixed, and a display device portable by a person or a vehicle. In an example, the first and second thermal sensor arrays 200 and 300 may be components provided to sense infrared light in the display device.

Figure 17:
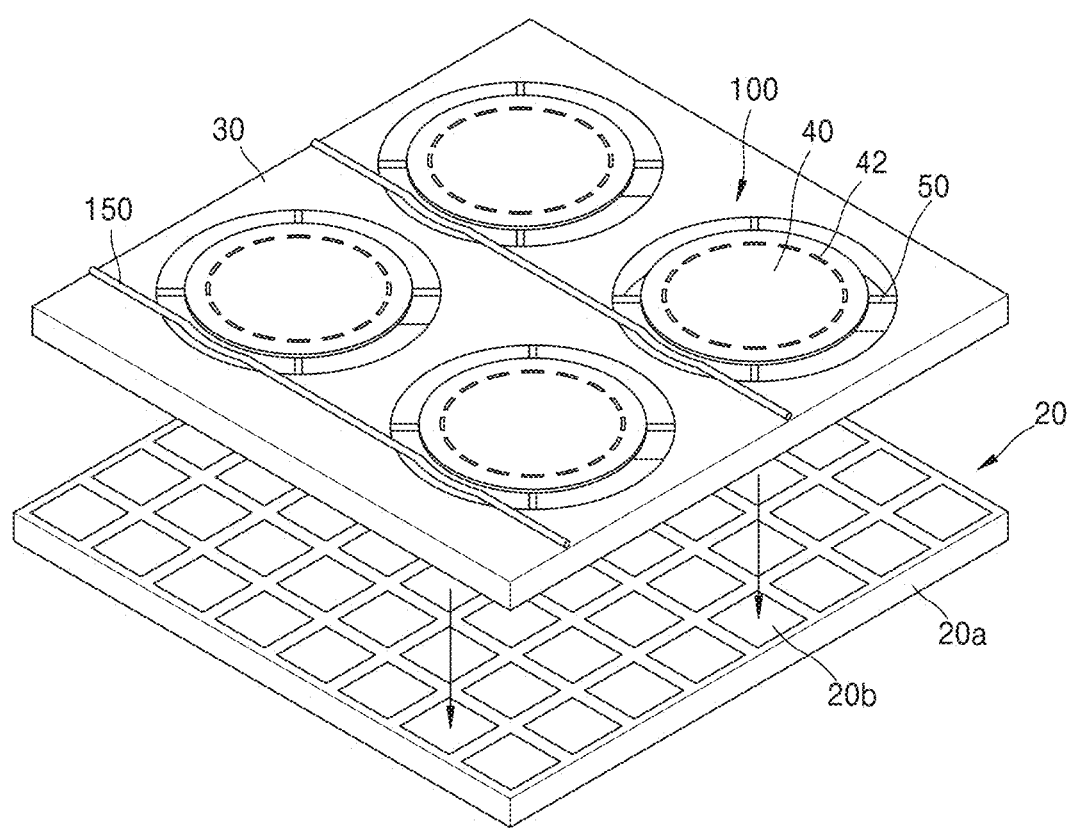
FIG. 17 is a perspective view of two rows and two columns selected from a thermal sensor array of FIG. 15 or 16.

FIG. 17 is a perspective view of two rows and two columns selected from the first thermal sensor array 200 of FIG. 15 or the second thermal sensor array 300 of FIG. 16.

Referring to FIG. 17, in each of the thermal sensor arrays 200 and 300, one resonator 40 may correspond to a plurality of pixels of the image sensor 20 thereunder. In each of the thermal sensor arrays 200 and 300, one thermal sensor 100' may correspond to one of pixels of a thermal image for an object (an external object) sensed by each of the thermal sensor arrays 200 and 300. Thus, by reducing a size of the thermal sensor 100' of each of the thermal sensor arrays 200 and 300, the integration of each of the thermal sensor arrays 200 and 300 may be increased and the resolution of the thermal image of the object sensed by each of the thermal sensor arrays 200 and 300 may be increased. Each of the thermal sensor arrays 200 and 300 senses a thermal image by receiving visible light generated from the resonator 40 through the image sensor 20 when the wavelength of light supplied from the light source 80 corresponds to the resonant wavelength of the resonator 40, and correspondence of the resonant wavelength and corresponding radiation of visible light from the resonator 40 may be maintained even when the size of the thermal sensor 100' is reduced. In other words, regardless of size reduction of the thermal sensor 100', visible light radiation corresponding to the resonant wavelength may occur normally in each of the thermal sensor arrays 200 and 300.

Thus, when the thermal sensor array 200 or 300 according to an embodiment is used, the integration of the thermal sensor array 200 or 300 may be improved while using a CMOS visible light image sensor.

The thermal sensor or thermal sensor array according to an embodiment described above may be applied to a thermal imaging camera, and may also be used in a device for capturing an image or a photo in a limited visibility or low light condition.

Figure 18:
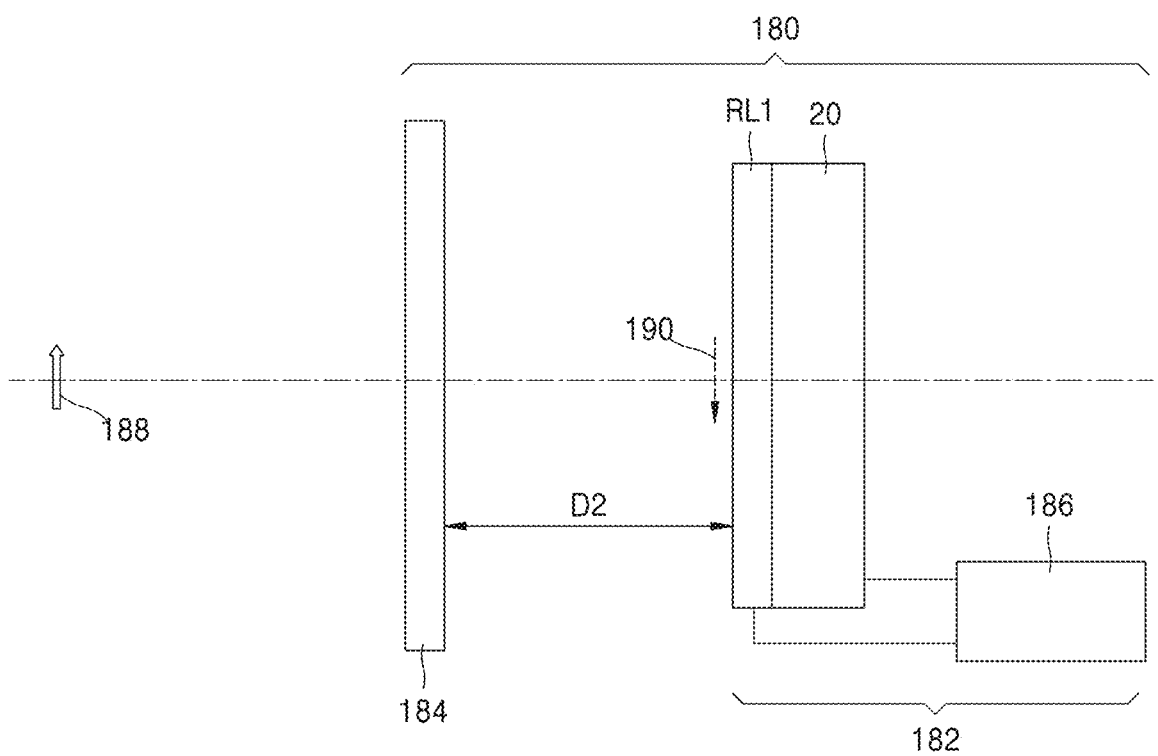
FIG. 18 is a block diagram of a thermal imaging camera as an example of a first electronic apparatus according to an embodiment.

FIG. 18 shows a thermal imaging camera 180 as an example of an electronic device configured to capture images.

Referring to FIG. 18, the thermal imaging camera 180 may include a thermal sensor 182 and an infrared optical system 184. The thermal sensor 182 may include the thermal sensor 100 described above or the thermal sensor array 200 or 300. In an example, the infrared optical system 184 may form a thermal image 190, i.e., an infrared image (e.g., an MWIR image). The thermal sensor 182 and the infrared optical system 184 may be separated from each other by a second distance D2. In an example, the second distance D2 may correspond to a focal length of the infrared optical system 184. Thus, the thermal sensor 182 may be located in a focal plane of the infrared optical system 184. Accordingly, a thermal image 190 formed by the infrared optical system 184 may be imaged on the thermal sensor 182. In other words, a distribution map of infrared light incident onto the camera 180 from an object 188 outside the camera 180 may be displayed on the thermal sensor 182 by the infrared optical system 184. That is, the thermal image 190 of the object 188 may be transmitted to the thermal sensor 182 by the optical system 184. The thermal sensor 182 may include the resonator layer RL1, the image sensor 20, and a controller 186 connected to the resonator layer RL1 and the image sensor 20. The controller 186 may be connected to the image sensor 20 through a control terminal. The controller 186 may be connected to the light source 80 and control a light radiation operation of the light source 80 to change the wavelength of light radiated from the light source 80. The wavelength change operation of the light source 80 may be controlled by the controller 186 to correspond to (interact with) the resonance of the resonator 40 of the resonator layer RL1. As the controller 186 is connected to the resonator layer RL1 and the image sensor 20 at the same time, the wavelength change of the light source 80 and the detection of visible light radiated from a visible light radiation region of the resonator layer RL1 may be made in real time, thereby measuring the resonant wavelength of the resonator 40 in real time. The controller 186 may be implemented as a processor and/or an analog control circuit.

The resonator layer RL1 may be arranged to face the optical system 184. The resonator layer RL1 may be located in the focal plane of the optical system 184.

The thermal image 190 may be imaged on the thermal sensor 182, and visible light may be radiated to the image sensor 20 from the resonator 40 through the shift of the resonant wavelength of the resonator 40 of the thermal sensor 182 and the wavelength change operation of the light source 80 corresponding thereto. The image sensor 20 may receive such light and form a visible light image pattern corresponding to the thermal image 190. An image pattern formed by the image sensor 20 may include information (data) about the resonant frequency shift of the resonator 40, and thus may be used as intermediate data for calculating a temperature change of the resonator 40 and the intensity of infrared light incident onto the resonator 40 as the thermal image 190 is formed on the resonator layer RL1.

As the surface temperature of the object 188 increases, the intensity of the infrared light incident onto the resonator 40 may increase, such that the surface temperature of the object 188 may be known by measuring the intensity of the infrared light incident onto the resonator 40. That is, information about distribution of the surface temperature of the object 188 may be known from an infrared intensity distribution map of the thermal image 190.

For the thermal image 190 of the object 188 formed by the optical system 184, the thermal sensor 182 shows an infrared intensity distribution corresponding thereto on the thermal sensor array. Such an infrared intensity distribution may not transmit any information without the optical system 184, and a thermal image by the optical system 184 may correspond to an infrared image of the object 188.

When the thermal image 190 is incident onto the thermal sensor 182, a shift value of the resonant wavelength of each thermal sensor 100' of the thermal sensor array due to incidence of the thermal image 190 may be measured by the controller 186, and the intensity of the infrared light incident onto the thermal sensor 100' may be calculated by the measured shift value of the resonant wavelength, such that the thermal sensor 182 may determine the thermal image 190 as the infrared image of the object 188.

The thermal imaging camera 180 may be a still image camera or a video camera.

The thermal imaging camera 180 may include an electronic device for processing or converting data generated by an operation of each element.

In an example, when it is necessary to transmit the thermal image 190 determined by the thermal sensor 182 to a display unit in the camera 180 or a display device outside the thermal imaging camera 180, the electronic device may include a video signal according to a known standard procedure.

In an example, a data array obtained from the image sensor 20 may be encoded and then transmitted to an internal or external display through an analog or digital interface. When an image obtained from the image sensor 20 needs to be stored, data about the obtained image may be recorded on a memory.

In an example, a thermal image or an infrared image obtained from the thermal sensor 100 or the thermal sensor array 200 or 300 according to an embodiment described above may be superimposed onto a visible image (e.g., a visible image obtained through a mobile phone) obtained from a visible image sensor. By doing so, a clear image may be obtained in real time in a poor environment such as a low light condition.

To this end, the thermal imaging camera 180 may include a separate visible light camera for capturing a visible image. On the other hand, a thermal imaging camera may be provided in a visible light camera for capturing a color or black/white image.

In this case, the thermal imaging camera and the visible light camera may be arranged such that the thermal image obtained from the thermal imaging camera is superimposed onto the visible image in real time.

Besides, superimposition between the thermal image and the visible image may be used for various purposes, for example, a night-time driving vehicle, and may be used in the medical field for determining a disease of an individual organ and a temperature thereof as well as for measuring vein biometry, and in everyday life, it may be used, for example, to manufacture a frame structure of a house to control heat dissipation and find where cold air is blowing in a window frame by using a smartphone.

Figure 19:
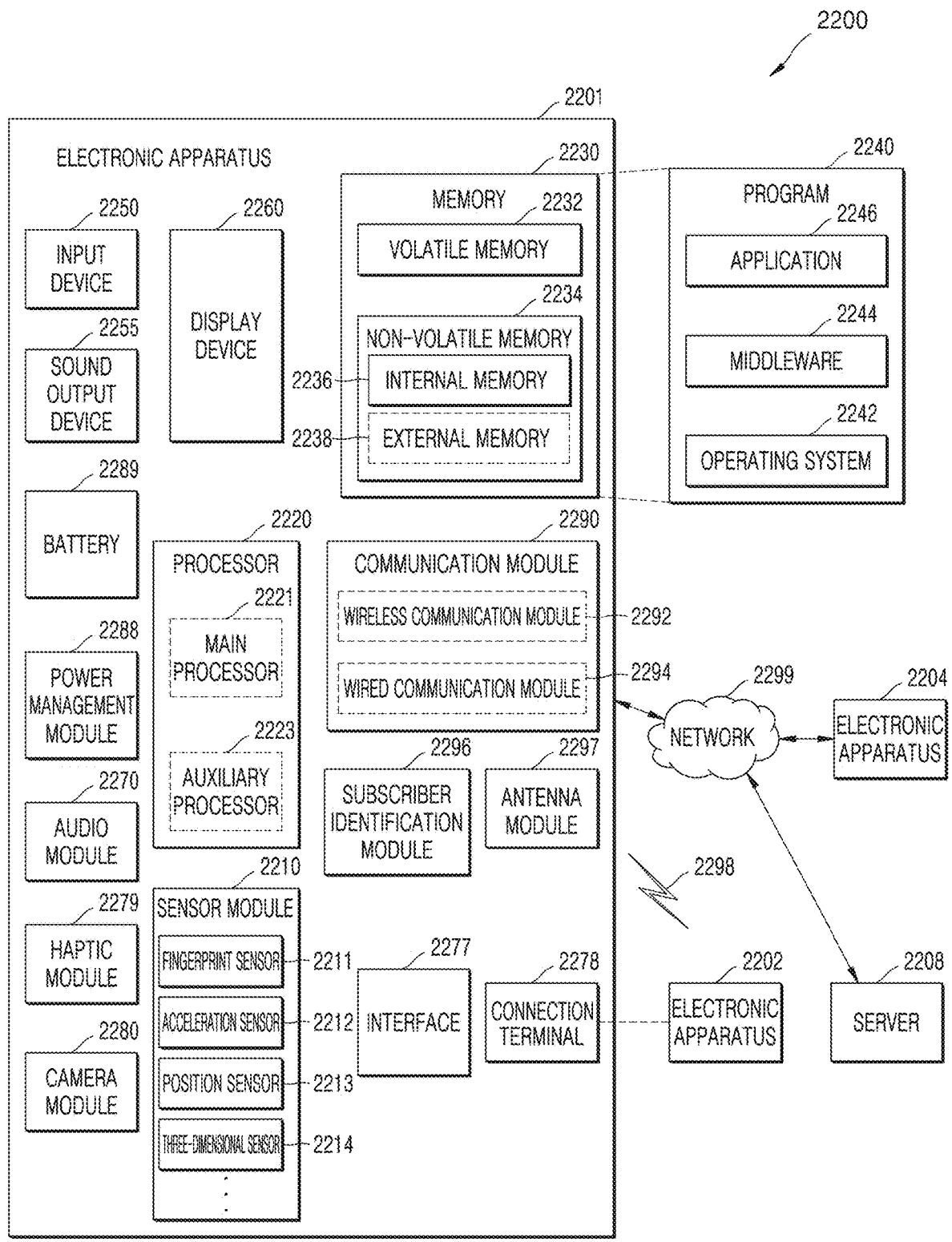
FIG. 19 is a block diagram of schematic configuration of a second electronic apparatus according to an embodiment.

FIG. 19 is a block diagram of schematic configuration of an electronic apparatus according to an embodiment.

Referring to FIG. 19, in a network environment 2200, an electronic apparatus 2201 may communicate with another electronic apparatus 2202 through a first network 2298 (a short-range wireless communication network, etc.) or communicate with another electronic apparatus 2204 and/or a server 2208 through a second network 2299 (a long-range wireless communication network, etc.). The electronic apparatus 2201 may communicate with the electronic apparatus 2204 via the server 2208. The electronic apparatus 2201 may include a processor 2220, a memory 2230, an input device 2250, a sound output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic apparatus 2201, some (the display device 2260, etc.) of the components may be omitted or another component may be added. Some of the components may be configured as one integrated circuit. For example, a fingerprint sensor 2211, an iris sensor, an illumination sensor, etc., of the sensor module 2210 may be implemented in a form embedded in the display device 2260 (a display, etc.).

The processor 2220 may control one or more components (hardware, software components, etc.) of the electronic apparatus 2201 connected to the processor 2220 by executing software (the program 2240, etc.), and may perform various data processes or operations. As a part of the data processes or operations, the processor 2220 may load a command and/or data received from another component (the sensor module 2210, the communication module 2290, etc.) to a volatile memory 2232, may process the command and/or data stored in the volatile memory 2232, and may store result data in a non-volatile memory 2234. The processor 2220 may include a main processor 2221 (a central processing unit, an application processor, etc.) and an auxiliary processor 2223 (a graphics processor unit (GPU), an image signal processor, a sensor hub processor, a communication processor, etc.) that may operate independently of or along with the main processor 2221. The auxiliary processor 2223 may use less power than that of the main processor 2221, and may perform specified functions.

The auxiliary processor 2223, on behalf of the main processor 2221 while the main processor 2221 is in an inactive state (a sleep state), or along with the main processor 2221 while the main processor 2221 is in an active state (an application executed state), may control functions and/or states related to some (the display device 2260, the sensor module 2210, the communication module 2290, etc.) of the components of the electronic apparatus 2201. The auxiliary processor 2223 (the image signal processor, the communication processor, etc.) may be implemented as a part of another component (the camera module 2280, the communication module 2290, etc.) that is functionally related thereto.

The memory 2230 may store various data required by the components (the processor 2220, the sensor module 2276, etc.) of the electronic apparatus 2201. The data may include, for example, software (the program 2240, etc.) and input data and/or output data about commands related thereto. The memory 2230 may include the volatile memory 2232 or the non-volatile memory 2234. The non-volatile memory 2234 may include an internal memory 2236 and an external memory 2238. The program 2240 may be stored as software in the memory 2230, and may include an operating system 2242, middleware 2244, and/or an application 2246.

The input device 2250 may receive commands and/or data to be used in the components (the processor 2220, etc.) of the electronic apparatus 2201, from the outside (a user, etc.) of the electronic apparatus 2201. The input device 2250 may include a microphone, a mouse, a keyboard, and/or a digital pen (a stylus pen).

The sound output device 2255 may output a sound signal to the outside of the electronic apparatus 2201. The sound output device 2255 may include a speaker and/or a receiver. The speaker may be used for a general purpose such as multimedia reproduction or record play, and the receiver may be used to receive a call. The receiver may be coupled as a part of the speaker or may be implemented as an independent separate device.

The display device 2260 may provide visual information to the outside of the electronic apparatus 2201. The display device 2260 may include a display, a hologram device, or a projector, and a control circuit for controlling the corresponding device. The display device 2260 may include a touch circuitry configured to sense a touch, and/or a sensor circuit (a pressure sensor, etc.) that is configured to measure a strength of a force generated by the touch.

The audio module 2270 may convert sound into an electrical signal or vice versa. The audio module 2270 may acquire sound through the input device 2250, or may output sound via the sound output device 2255 and/or a speaker and/or a headphone of another electronic device (the electronic apparatus 2202, etc.) connected directly or wirelessly to the electronic apparatus 2201.

The sensor module 2210 may sense an operating state (power, temperature, etc.) of the electronic apparatus 2201, or an outer environmental state (a user state, etc.), and may generate an electrical signal and/or a data value corresponding to the sensed state. The sensor module 2210 may include the fingerprint sensor 2211, an acceleration sensor 2212, a position sensor 2213, a three-dimensional (3D) sensor 2214, etc., and may also include an iris sensor, a gyro sensor, a pressure sensor, a magnetic sensor, a grip sensor, a proximity sensor, a color sensor, an infrared (IR) sensor, a biometric sensor, a temperature sensor, a humidity sensor, and/or an illumination sensor.

The 3D sensor 2214 may sense a shape, a motion, etc., of a subject by emitting or radiating certain light to the subject and analyzing the light reflected from the subject, and may include a meta-optical element.

The interface 2277 may support one or more designated protocols that may be used in order for the electronic apparatus 2201 to be directly or wirelessly connected to another electronic device (the electronic apparatus 2202, etc.). The interface 2277 may include a high-definition multimedia interface (HDMI), a universal serial bus (USB) interface, a secure digital (SD) card interface, and/or an audio interface.

The connection terminal 2278 may include a connector by which the electronic apparatus 2201 may be physically connected to another electronic apparatus (the electronic apparatus 2202, etc.). The connection terminal 2278 may include an HDMI connector, a USB connector, an SD card connector, and/or an audio connector (a headphone connector, etc.).

The haptic module 2279 may convert the electrical signal into a mechanical stimulation (vibration, motion, etc.) or an electric stimulation that the user may sense through a tactile or motion sensation. The haptic module 2279 may include a motor, a piezoelectric device, and/or an electric stimulus device.

The camera module 2280 may capture a still image and a moving image. The camera module 2280 may include a lens assembly including one or more lenses, image sensors, image signal processors, and/or flashes. The lens assembly included in the camera module 2280 may collect light emitted from an object that is an object to be captured. In an example, the camera module 2280 may be provided to capture at least one of a visible image and a thermal image (or an infrared image) of the object. In an example, the camera module 2280 may include a thermal sensor, a thermal sensor array, and/or the thermal imaging camera 180 according to the above-described embodiment to capture the infrared image of the object. In an example, the image signal processor included in the camera module 2280 may perform an operation of superimposing the infrared image obtained by the thermal imaging camera 180 onto the visible image.

The power management module 2288 may manage power supplied to the electronic apparatus 2201. The power management module 2288 may be implemented as a part of a power management integrated circuit (PMIC).

The battery 2289 may supply electric power to components of the electronic apparatus 2201. The battery 2289 may include a primary battery that is not rechargeable, a secondary battery that is rechargeable, and/or a fuel cell.

The communication module 2290 may support establishment of a direct (wired) communication channel and/or a wireless communication channel between the electronic apparatus 2201 and another electronic apparatus (the electronic apparatus 2202, the electronic apparatus 2204, the server 2208, etc.), and execution of communication through the established communication channel. The communication module 2290 may operate independently of the processor 2220 (the application processor, etc.), and may include one or more communication processors that support the direct communication and/or the wireless communication. The communication module 2290 may include a wireless communication module 2292 (a cellular communication module, a short-range wireless communication module, a global navigation satellite system (GNSS) communication module) and/or a wired communication module 2294 (a local area network (LAN) communication module, a power line communication module, etc.). From among the communication modules, a corresponding communication module may communicate with another electronic device via a first network 2298 (a short-range communication network such as Bluetooth, Wireless Fidelity (WiFi) Direct, or Infrared Data Association (IrDA)) or a second network 2299 (a long-range communication network such as a cellular network, Internet, or a computer network (LAN, a wide area network (WAN), etc.)). Such various kinds of communication modules may be integrated as one component (a single chip, etc.) or may be implemented as a plurality of components (a plurality of chips) separately from one another. The wireless communication module 2292 may identify and authenticate the electronic apparatus 2201 in a communication network such as the first network 2298 and/or the second network 2299 by using subscriber information (an international mobile subscriber identifier (IMSI), etc.) stored in the subscriber identification module 2296.

The antenna module 2297 may transmit or receive a signal and/or power to/from outside (another electronic apparatus, etc.). An antenna may include a radiator formed as a conductive pattern formed on a substrate (a printed circuit board (PCB), etc.). The antenna module 2297 may include one or more antennas. When the antenna module 2297 includes a plurality of antennas, an antenna that is suitable for a communication scheme used in the communication network such as the first network 2298 and/or the second network 2299 may be selected by the communication module 2290 from among the plurality of antennas. The signal and/or the power may be transmitted between the communication module 2290 and another electronic apparatus via the selected antenna. Another component (a radio frequency integrated circuit (RFIC), etc.) other than the antenna may be included as a part of the antenna module 2297.

Some of the components may be connected to one another via a communication scheme between peripheral devices (a bus, general purpose input and output (GPIO), a serial peripheral interface (SPI), a mobile industry processor interface (MIPI), etc.) and may exchange signals (commands, data, etc.).

The command or data may be transmitted or received between the electronic apparatus 2201 and the external electronic apparatus 2204 via the server 2208 connected to the second network 2299. Other electronic apparatuses 2202 and 2204 may be devices of types that are the same as or different from the electronic apparatus 2201. All or some of operations executed in the electronic apparatus 2201 may be executed in one or more apparatuses among the other electronic apparatuses 2202, 2204, and 2208. For example, when the electronic apparatus 2201 has to perform a certain function or service, the electronic apparatus 2201 may request one or more other electronic apparatuses to perform some or entire function or service, instead of executing the function or service by itself. One or more electronic apparatuses receiving the request execute an additional function or service related to the request and may transfer a result of the execution to the electronic apparatus 2201. For this end, cloud computing, distributed computing, and/or a client-server computing technique may be used.

Although many matters are specifically described in the foregoing description, they should be interpreted as an example of an embodiment, rather than limiting the scope of the disclosure. Therefore, the scope of the disclosure should not be determined by the described embodiments, but by the technical spirit set forth in the claims.

The disclosed thermal sensor may use visible light generated in the microresonator to sense infrared light. The visible light is received using the CMOS image sensor optically coupled with the microresonator. That is, the disclosed thermal sensor may be compatible with the CMOS technology. Thus, by using the disclosed thermal sensor, the thermal sensor structure is not complex when compared to an existing case where the thermal sensor is electrically connected, and a manufacturing process is relatively simple, thus lowering a manufacturing cost.

Moreover, when infrared light is incident onto the microresonator, visible light may be generated in the microresonator correspondingly, and the size of one microresonator may be equal to or greater than the size of one pixel of an image sensor under the microresonator in spite of size reduction of the microresonator, such that the visible light may be still radiated in the microresonator and the radiated visible light may be sensed by the image sensor under the resonator. As a result, the visible light radiated from the microresonator may not be related to the size of the microresonator, such that the disclosed thermal sensor may be implemented with a compact thermal sensor. In other words, by using the disclosed thermal sensor, the integration of the thermal sensor may be improved.

Moreover, the visible light radiated from the microresonator of the disclosed thermal sensor may be radiated when harmonics (visible light) generated in the microresonator satisfy a specific condition in relation to the resonant wavelength of the microresonator, and thus the intensity of the visible light may sharply decrease even with a slight change of the resonant wavelength of the microresonator. In other words, the intensity of the visible light radiated from the microresonator may greatly change with a small change of the resonant wavelength of the microresonator.

In a sense that the resonant wavelength of the microresonator changes when the infrared light is incident onto the microresonator, a large change in the intensity of the visible light radiated from the microresonator with a very small change in the resonant wavelength of the microresonator may mean that the infrared sensitivity of the disclosed thermal sensor is very high.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A thermal sensor comprising:
   a first region onto which first infrared light is incident;
   a visible light radiation region configured to emit visible light that is generated in response to the first infrared light being incident on the first region;
   a second region onto which second infrared light is incident; and
   an image sensor configured to receive the visible light emitted from the visible light radiation region,
   wherein each of the first region, the second region, and the visible light radiation region comprises a nonlinear optical material.

2. The thermal sensor of claim 1, wherein the first region, the second region, and the visible light radiation region are connected to one another.

3. The thermal sensor of claim 1, wherein the visible light radiation region is in the second region.

4. The thermal sensor of claim 3, wherein the visible light radiation region is located between an edge of the second region and a center of the second region, and surrounds the center.

5. The thermal sensor of claim 1, wherein the visible light radiation region is in an outer boundary of the second region.

6. The thermal sensor of claim 1, wherein the visible light includes harmonics generated in response to the first infrared light being incident on the first region.

7. The thermal sensor of claim 6, wherein the visible light radiation region comprises a decoupler arranged at a harmonic resonance distance where the harmonics are reached.

8. The thermal sensor of claim 7, wherein the decoupler comprises a diffraction grating.

9. The thermal sensor of claim 1, further comprising:
   a resonator optically coupled to the image sensor;
   a waveguide configured to form optical coupling between a part of the waveguide and the resonator;
   a light source provided to emit the first infrared light into the waveguide; and
   a controller configured to change a wavelength of light emitted from the light source to correspond to a change of a resonant wavelength of the resonator,
   wherein the resonator comprises a top surface and a side surface, and
   a region of the side surface of the resonator, which forms the optical coupling with the waveguide, corresponds to the first region, the top surface of the resonator corresponds to the second region, and the visible light radiation region is a partial region of the top surface.

10. The thermal sensor of claim 9, wherein a portion of the waveguide, optically coupled to the resonator, is linear or curved.

11. The thermal sensor of claim 9, wherein the waveguide comprises a non-linear optical material.

12. The thermal sensor of claim 9, further comprising:
    a transparent substrate comprising a through-hole; and
    a thermally insulating bridge provided to connect the transparent substrate to the resonator and support the resonator,
    wherein the resonator is located inside the through-hole and does not directly contact the substrate, and
    a part of the through-hole except for the resonator and the thermally insulating bridge, is filled with a thermally insulating layer.

13. The thermal sensor of claim 1, wherein the image sensor comprises a complementary metal oxide semiconductor (CMOS) image sensor.

14. The thermal sensor of claim 1, wherein the nonlinear optical material comprises a silicon nitride.

15. The thermal sensor of claim 12, wherein a plurality of through-holes are provided to be separated from each other in the transparent substrate,
    the resonator, the thermally insulating bridge, and the thermally insulating layer are provided in each of the plurality of through-holes, and
    the waveguide is shared by the resonators provided in the plurality of through-holes.

16. The thermal sensor of claim 15, wherein the plurality of through-holes are arranged to form a matrix,
    an optical splitter is further provided between the light source and the plurality of through-holes,
    the waveguide comprises a plurality of waveguides, and
    one of the plurality of waveguides is provided between the light source and the optical splitter, and the other of the plurality of waveguides are arranged in a one-to-one correspondence with rows or columns of the plurality of through-holes.

17. A thermal imaging camera comprising:
    an infrared optical system configured to form a thermal image of an object; and
    a thermal sensor arranged at a focal distance of the infrared optical system on which the thermal image is imaged,
    wherein the thermal sensor comprises:
    a first region onto which first infrared light is incident;
    a visible light radiation region configured to emit visible light that is generated in response to the first infrared light being incident on the first region;
    a second region onto which the thermal image is incident; and
    an image sensor provided at a position to receive the visible light emitted from the visible light radiation region, and
    each of the first region, the second region, and the visible light radiation region comprises a nonlinear optical material.

18. The thermal imaging camera of claim 17, further comprising:
    a resonator optically coupled to the image sensor and comprising the nonlinear optical material;
    a waveguide configured to form optical coupling between a part of the waveguide and the resonator;
    a light source provided to emit the first infrared light into the waveguide; and a controller provided to change a wavelength of light emitted from the light source to correspond to a change of a resonant wavelength of the resonator and connected to the image sensor, wherein the resonator comprises a top surface and a side surface, and a region of the side surface of the resonator, which forms optical coupling with the waveguide, corresponds to the first region, the top surface of the resonator corresponds to the second region, and the visible light radiation region is a partial region of the top surface.

19. An electronic apparatus comprising the thermal sensor of claim 1.

20. An operating method of a thermal sensor, the operating method comprising:

receiving visible light emitted from a resonator of the thermal sensor before shifting of a resonant wavelength of the resonator to obtain first data about a first visible image of the resonator;

receiving visible light emitted from the resonator after shifting of the resonant wavelength of the resonator due to incidence of external infrared light onto the resonator to obtain second data about a second visible image of the resonator;

obtaining, based on the first data and the second data, third data about shifting of the resonant wavelength of the resonator due to the incidence of the external infrared light; and determine, based on the third data, a temperature of the resonator and an intensity of the external infrared light on the resonator due to the incidence of the external infrared light.

* * * * *